(12) United States Patent
Murray et al.

(10) Patent No.: US 7,392,522 B2
(45) Date of Patent: *Jun. 24, 2008

(54) ARCHITECTURES FOR AND METHODS OF PROVIDING NETWORK-BASED SOFTWARE EXTENSIONS

(75) Inventors: Michael C. Murray, Kirkland, WA (US); Paul R. Erickson, Sammamish, WA (US); Oliver G. Fisher, Ottawa (CA); Michael J. Hopcroft, Kirkland, WA (US); Suryanarayanan V. Raman, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

This patent is subject to a terminal disclaimer.

(21) Appl. No.: 10/953,933

(22) Filed: Sep. 29, 2004

(65) Prior Publication Data

US 2005/0044524 A1 Feb. 24, 2005

Related U.S. Application Data

(63) Continuation of application No. 09/599,812, filed on Jun. 21, 2000, now Pat. No. 6,874,143.

(51) Int. Cl.
*G06F 9/45* (2006.01)
(52) U.S. Cl. ..................................... 717/174
(58) Field of Classification Search .................. 717/174
See application file for complete search history.

(56) References Cited

U.S. PATENT DOCUMENTS

| 4,201,978 A | 5/1980 | Nally |
| 4,498,147 A | 2/1985 | Agnew et al. |

(Continued)

FOREIGN PATENT DOCUMENTS

EP 0841615 11/1999

(Continued)

OTHER PUBLICATIONS

Laura Acklen and Read Gilgen, "Using Corel Wordperfect 9", 251-284, 424-434, 583-586 (1998).

(Continued)

*Primary Examiner*—Mary Steelman

(57) ABSTRACT

Methods and systems for network-based or Internet-based software delivery are described. In one embodiment, an application program or software platform resides on a client. The program or platform is configured so that it is extensible based on software extensions that are deliverable over a network such as the Internet. Various extensions can be developed by third party developers for incorporation into the program or platform. In the described embodiment, extension files that comprise a software extension are hosted on an Internet server. Additional files are also hosted on the Internet server and describe aspects of the software extension. These additional files include files that describe a logical attachment of the extension to the program or platform, as well as files that describe the location of the extension files. Extensions are incorporated on a client by navigating to a particular Internet site through which the extensions can be accessed. The files describing the extension files are downloaded on the client. These files tell the client where the particular extension is to be plugged in, as well as where to find the appropriate extension files and how to download them. The extension files are then downloaded and incorporated into the program or platform.

17 Claims, 16 Drawing Sheets

U.S. PATENT DOCUMENTS

| | | |
|---|---|---|
| 4,514,800 A | 4/1985 | Gruner et al. |
| 4,564,752 A | 1/1986 | Lepic et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,933,880 A | 6/1990 | Borgendale et al. |
| 4,962,475 A | 10/1990 | Hernandez et al. |
| 5,025,484 A | 6/1991 | Yamanari et al. |
| 5,072,412 A | 12/1991 | Henderson, Jr. et al. |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A * | 8/1998 | Sadowsky .................... 709/221 |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,974,454 A * | 10/1999 | Apfel et al. .................. 709/221 |
| 5,982,370 A | 11/1999 | Kamper |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |

| | | | |
|---|---|---|---|
| 6,035,297 A | 3/2000 | Van Huben et al. |
| 6,035,309 A | 3/2000 | Dauerer et al. |
| 6,044,205 A | 3/2000 | Reed et al. |
| 6,052,531 A * | 4/2000 | Waldin et al. ............... 717/170 |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,097,382 A | 8/2000 | Rosen et al. |
| 6,098,081 A | 8/2000 | Heidorn et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,698 B1 | 4/2001 | Iannucci et al. |
| 6,225,996 B1 | 5/2001 | Gibb et al. |
| 6,235,027 B1 | 5/2001 | Herzon |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,281,896 B1 | 8/2001 | Alimpich et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,308,273 B1 | 10/2001 | Goertzel et al. |
| 6,311,271 B1 | 10/2001 | Gennaro et al. |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,342,907 B1 | 1/2002 | Petty et al. |
| 6,343,149 B1 | 1/2002 | Motoiwa |
| 6,343,302 B1 | 1/2002 | Graham |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,396,488 B1 | 5/2002 | Simmons et al. |
| 6,408,311 B1 | 6/2002 | Baisley et al. |
| 6,414,700 B1 | 7/2002 | Kurtenbach et al. |
| 6,421,656 B1 | 7/2002 | Cheng et al. |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,230 B1 | 1/2003 | Mohan et al. |
| 6,505,300 B2 | 1/2003 | Chan et al. |
| 6,507,856 B1 | 1/2003 | Chen et al. |
| 6,516,322 B1 | 2/2003 | Meredith |
| 6,519,617 B1 | 2/2003 | Wanderski et al. |
| RE38,070 E | 4/2003 | Spies et al. |
| 6,546,546 B1 | 4/2003 | Van Doorn |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,620 B1 | 5/2003 | Ching |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |

| | | | | | | |
|---|---|---|---|---|---|---|
| 6,651,217 B1 | 11/2003 | Kennedy et al. | | 7,107,521 B2 | 9/2006 | Santos |
| 6,654,737 B1 | 11/2003 | Nunez | | 7,146,564 B1 | 12/2006 | Kim et al. |
| 6,654,932 B1 | 11/2003 | Bahrs et al. | | 7,152,205 B2 | 12/2006 | Day et al. |
| 6,658,417 B1 | 12/2003 | Stakutis et al. | | 7,168,035 B1 | 1/2007 | Bell et al. |
| 6,658,622 B1 | 12/2003 | Aiken et al. | | 7,190,376 B1 | 3/2007 | Tonisson |
| 6,668,369 B1 | 12/2003 | Krebs et al. | | 7,191,394 B1 | 3/2007 | Ardeleanu et al. |
| 6,675,202 B1 | 1/2004 | Perttunen | | 7,236,982 B2 | 6/2007 | Zlatanov et al. |
| 6,691,230 B1 | 2/2004 | Bardon | | 7,272,789 B2 | 9/2007 | O'Brien |
| 6,691,281 B1 | 2/2004 | Sorge et al. | | 7,313,758 B2 | 12/2007 | Kozlov |
| 6,697,944 B1 | 2/2004 | Jones et al. | | 7,316,003 B1 | 1/2008 | Dulepet et al. |
| 6,701,434 B1 | 3/2004 | Rohatgi | | 7,318,237 B2 | 1/2008 | Moriconi et al. |
| 6,701,486 B1 | 3/2004 | Weber et al. | | 7,334,178 B1 | 2/2008 | Stanciu et al. |
| 6,704,906 B1 | 3/2004 | Yankovich et al. | | 7,346,610 B2 | 3/2008 | Ruthfield et al. |
| 6,711,679 B1 | 3/2004 | Guski et al. | | 7,350,141 B2 | 3/2008 | Kotler |
| 6,720,985 B1 | 4/2004 | Silverbrook et al. | | 2001/0007109 A1 | 7/2001 | Lange |
| 6,725,426 B1 | 4/2004 | Pavlov | | 2001/0022592 A1 | 9/2001 | Alimpich et al. |
| 6,728,755 B1 | 4/2004 | de Ment | | 2001/0024195 A1 | 9/2001 | Hayakawa |
| 6,735,721 B1 | 5/2004 | Morrow et al. | | 2001/0037345 A1 | 11/2001 | Kleman et al. |
| 6,748,385 B1 | 6/2004 | Rodkin et al. | | 2001/0054004 A1 | 12/2001 | Powers |
| 6,751,777 B2 | 6/2004 | Bates et al. | | 2001/0056429 A1 | 12/2001 | Moore et al. |
| 6,754,874 B1 | 6/2004 | Richman | | 2001/0056460 A1 | 12/2001 | Sahota et al. |
| 6,757,868 B1 | 6/2004 | Glaser et al. | | 2002/0010743 A1 | 1/2002 | Ryan et al. |
| 6,760,723 B2 | 7/2004 | Oshinsky et al. | | 2002/0010746 A1 | 1/2002 | Jilk, Jr. et sl. |
| 6,763,343 B1 | 7/2004 | Brooke et al. | | 2002/0013788 A1 | 1/2002 | Pennell et al. |
| 6,772,139 B1 | 8/2004 | Smith, III | | 2002/0023113 A1 | 2/2002 | Hsing et al. |
| 6,772,165 B2 | 8/2004 | O'Carroll | | 2002/0026441 A1 | 2/2002 | Kutay et al. |
| 6,774,926 B1 | 8/2004 | Ellis et al. | | 2002/0026461 A1 | 2/2002 | Kutay et al. |
| 6,779,154 B1 | 8/2004 | Nussbaum et al. | | 2002/0032590 A1 | 3/2002 | Anand et al. |
| 6,781,609 B1 | 8/2004 | Barker et al. | | 2002/0032706 A1 | 3/2002 | Perla et al. |
| 6,782,144 B2 | 8/2004 | Bellavita et al. | | 2002/0032768 A1 | 3/2002 | Voskuil |
| 6,799,299 B1 | 9/2004 | Li et al. | | 2002/0035579 A1 | 3/2002 | Wang et al. |
| 6,801,929 B1 | 10/2004 | Donoho et al. | | 2002/0035581 A1 | 3/2002 | Reynar et al. |
| 6,816,849 B1 | 11/2004 | Halt, Jr. | | 2002/0040469 A1 | 4/2002 | Pramberger |
| 6,845,380 B2 | 1/2005 | Su et al. | | 2002/0057297 A1 | 5/2002 | Grimes et al. |
| 6,845,499 B2 | 1/2005 | Srivastava et al. | | 2002/0070973 A1 | 6/2002 | Croley |
| 6,847,387 B2 | 1/2005 | Roth | | 2002/0078074 A1 | 6/2002 | Cho et al. |
| 6,848,078 B1 | 1/2005 | Birsan et al. | | 2002/0078103 A1 | 6/2002 | Gorman et al. |
| 6,871,220 B1 | 3/2005 | Rajan et al. | | 2002/0100027 A1 | 7/2002 | Binding et al. |
| 6,874,130 B1 | 3/2005 | Baweja et al. | | 2002/0112224 A1 | 8/2002 | Cox |
| 6,889,359 B1 | 5/2005 | Conner et al. | | 2002/0129056 A1 | 9/2002 | Conant |
| 6,901,403 B1 | 5/2005 | Bata et al. | | 2002/0133484 A1 | 9/2002 | Chau et al. |
| 6,915,454 B1 | 7/2005 | Moore et al. | | 2002/0152222 A1 | 10/2002 | Holbrook |
| 6,931,532 B1 | 8/2005 | Davis et al. | | 2002/0152244 A1 | 10/2002 | Dean et al. |
| 6,941,510 B1 | 9/2005 | Ozzie et al. | | 2002/0156772 A1 | 10/2002 | Chau et al. |
| 6,941,511 B1 | 9/2005 | Hind et al. | | 2002/0156846 A1 | 10/2002 | Rawat et al. |
| 6,941,521 B2 | 9/2005 | Lin et al. | | 2002/0156929 A1 | 10/2002 | Hekmatpour |
| 6,948,133 B2 | 9/2005 | Haley | | 2002/0169789 A1 | 11/2002 | Kutay et al. |
| 6,948,135 B1 | 9/2005 | Ruthfield et al. | | 2002/0174147 A1 | 11/2002 | Wang et al. |
| 6,950,980 B1 | 9/2005 | Malcolm | | 2002/0174417 A1 | 11/2002 | Sijacic et al. |
| 6,961,897 B1 | 11/2005 | Peel, Jr. et al. | | 2002/0184219 A1 | 12/2002 | Preisig et al. |
| 6,963,875 B2 | 11/2005 | Moore et al. | | 2002/0188597 A1 | 12/2002 | Kern et al. |
| 6,968,503 B1 | 11/2005 | Chang et al. | | 2002/0188613 A1 | 12/2002 | Chakraborty et al. |
| 6,968,505 B2 | 11/2005 | Stoll et al. | | 2002/0194219 A1 | 12/2002 | Bradley et al. |
| 6,993,714 B2 | 1/2006 | Kaler et al. | | 2002/0196281 A1 | 12/2002 | Audleman et al. |
| 6,996,776 B1 | 2/2006 | Makely et al. | | 2002/0196288 A1 | 12/2002 | Emrani |
| 6,996,781 B1 | 2/2006 | Myers et al. | | 2002/0198891 A1 | 12/2002 | Li et al. |
| 7,003,722 B2 | 2/2006 | Rothchiller et al. | | 2002/0198935 A1 | 12/2002 | Crandall et al. |
| 7,024,417 B1 | 4/2006 | Russakovsky et al. | | 2003/0004951 A1 | 1/2003 | Chokshi |
| 7,032,170 B2 | 4/2006 | Poulose | | 2003/0007000 A1 | 1/2003 | Cartson et al. |
| 7,036,072 B1 | 4/2006 | Sulistio et al. | | 2003/0014397 A1 | 1/2003 | Chau et al. |
| 7,039,875 B2 | 5/2006 | Khalfay et al. | | 2003/0018668 A1 | 1/2003 | Britton et al. |
| 7,051,273 B1 | 5/2006 | Holt et al. | | 2003/0020746 A1 | 1/2003 | Chen et al. |
| 7,058,663 B2 | 6/2006 | Johnston et al. | | 2003/0023641 A1 | 1/2003 | Gorman et al. |
| 7,062,764 B2 | 6/2006 | Cohen et al. | | 2003/0025732 A1 | 2/2003 | Prichard |
| 7,065,493 B1 | 6/2006 | Homsi | | 2003/0026507 A1 | 2/2003 | Zlotnick |
| 7,080,083 B2 | 7/2006 | Kim et al. | | 2003/0037303 A1 | 2/2003 | Bodlaender et al. |
| 7,080,325 B2 | 7/2006 | Treibach-Heck et al. | | 2003/0043986 A1 | 3/2003 | Creamer et al. |
| 7,086,009 B2 | 8/2006 | Resnick et al. | | 2003/0046665 A1 | 3/2003 | Illn |
| 7,088,374 B2 | 8/2006 | David et al. | | 2003/0048301 A1 | 3/2003 | Menninger |
| 7,100,147 B2 | 8/2006 | Miller et al. | | 2003/0051243 A1 | 3/2003 | Lemmons et al. |
| 7,103,611 B2 | 9/2006 | Murthy et al. | | 2003/0055828 A1 | 3/2003 | Koch et al. |
| 7,106,888 B1 | 9/2006 | Silverbrook et al. | | 2003/0056198 A1 | 3/2003 | Al-Azzawe et al. |
| 7,107,282 B1 | 9/2006 | Yalamanchi | | 2003/0061386 A1 | 3/2003 | Brown et al. |

| | | |
|---|---|---|
| 2003/0061567 A1 | 3/2003 | Brown et al. |
| 2003/0084424 A1 | 5/2003 | Reddy et al. |
| 2003/0120578 A1 | 6/2003 | Newman |
| 2003/0120651 A1 | 6/2003 | Bernstein et al. |
| 2003/0120659 A1 | 6/2003 | Anandampillal |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0158897 A1 | 8/2003 | Ben-Natan et al. |
| 2003/0167277 A1 | 9/2003 | Hejlsberg et al. |
| 2003/0182268 A1 | 9/2003 | Lal |
| 2003/0182327 A1 | 9/2003 | Ramanujam et al. |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0204511 A1 | 10/2003 | Brundage et al. |
| 2003/0204814 A1 | 10/2003 | Elo et al. |
| 2003/0205615 A1 | 11/2003 | Marappan |
| 2003/0212664 A1 | 11/2003 | Breining et al. |
| 2003/0225469 A1 | 12/2003 | DeRemer et al. |
| 2003/0225768 A1 | 12/2003 | Chaudhuri et al. |
| 2003/0225829 A1 | 12/2003 | Pena et al. |
| 2003/0226111 A1 | 12/2003 | Wirts et al. |
| 2003/0226132 A1 | 12/2003 | Tondreau et al. |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0237046 A1 | 12/2003 | Parker et al. |
| 2003/0237047 A1 | 12/2003 | Borson |
| 2004/0002939 A1 | 1/2004 | Arora et al. |
| 2004/0003031 A1 | 1/2004 | Brown et al. |
| 2004/0003353 A1 | 1/2004 | Rivera et al. |
| 2004/0003389 A1 | 1/2004 | Reynar et al. |
| 2004/0010752 A1 | 1/2004 | Chan et al. |
| 2004/0024842 A1 | 2/2004 | Witt |
| 2004/0030991 A1 | 2/2004 | Hepworth et al. |
| 2004/0039990 A1 | 2/2004 | Bakar et al. |
| 2004/0044961 A1 | 3/2004 | Pesenson |
| 2004/0044965 A1 | 3/2004 | Toyama et al. |
| 2004/0059754 A1 | 3/2004 | Barghout et al. |
| 2004/0073565 A1 | 4/2004 | Kaufman et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088647 A1 | 5/2004 | Miller et al. |
| 2004/0093596 A1 | 5/2004 | Koyano |
| 2004/0107367 A1 | 6/2004 | Kisters |
| 2004/0117769 A1 | 6/2004 | Lauzon et al. |
| 2004/0123277 A1 | 6/2004 | Schrader et al. |
| 2004/0146199 A1 | 7/2004 | Berkner et al. |
| 2004/0163041 A1 | 8/2004 | Engel |
| 2004/0172442 A1 | 9/2004 | Ripley |
| 2004/0188762 A1 | 9/2004 | Beaven et al. |
| 2004/0189716 A1 | 9/2004 | Paoli et al. |
| 2004/0194035 A1 | 9/2004 | Chakraborty |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler et al. |
| 2004/0205592 A1 | 10/2004 | Huang |
| 2004/0205605 A1 | 10/2004 | Adler et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |
| 2004/0221238 A1 | 11/2004 | Cifra et al. |
| 2004/0221245 A1 | 11/2004 | Chickles et al. |
| 2004/0237030 A1 | 11/2004 | Malkin |
| 2004/0268229 A1 | 12/2004 | Paoli et al. |
| 2005/0004893 A1 | 1/2005 | Sangroniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0027757 A1 | 2/2005 | Kiessig et al. |
| 2005/0033728 A1 | 2/2005 | James |
| 2005/0038711 A1 | 2/2005 | Marlelo |
| 2005/0055627 A1 | 3/2005 | Lloyd et al. |
| 2005/0060324 A1 | 3/2005 | Johnson et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076049 A1 | 4/2005 | Qubti et al. |
| 2005/0091285 A1 | 4/2005 | Krishnan et al. |
| 2005/0091305 A1 | 4/2005 | Lange et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0138086 A1 | 6/2005 | Pecht-Seibert |
| 2005/0171746 A1 | 8/2005 | Thalhammer-Reyero |
| 2005/0198086 A1 | 9/2005 | Moore et al. |
| 2005/0198125 A1 | 9/2005 | Beck et al. |
| 2005/0198247 A1 | 9/2005 | Perry et al. |
| 2005/0223063 A1 | 10/2005 | Chang et al. |
| 2005/0223320 A1 | 10/2005 | Brintzenhofe et al. |
| 2005/0240876 A1 | 10/2005 | Myers et al. |
| 2005/0268222 A1 | 12/2005 | Cheng |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0085409 A1 | 4/2006 | Rys et al. |
| 2006/0101037 A1 | 5/2006 | Brill et al. |
| 2006/0143220 A1 | 6/2006 | Spencer, Jr. |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0094589 A1 | 4/2007 | Paoli |
| 2007/0100877 A1 | 5/2007 | Paoli |
| 2007/0101280 A1 | 5/2007 | Paoli |
| 2007/0208606 A1 | 9/2007 | MacKay et al. |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 63085960 | 4/1988 |
| JP | 401173140 A | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |

WO WO 01/44934 6/2001

OTHER PUBLICATIONS

Atova, "User Reference manual Version 4.4, XML Spy suite 4.4," Atova Ges.m.b.H and Altova, Inc., May 24, 2002, pages cover, copyright p. 1-565.

Altova, Inc., "XML Spy 4.0 Manual," Altova Inc. & Altova GmbH, coyright 1998-2001, Chapters 1, 2, and 6, encompassing pages 1-17, 18-90, and 343-362.

Altova et al. XML Spy, XML integrated Development Environments, Altova Inc., 2002, pp. 1-18.

Ben-Natan, Provisional U.S. Appl. No. 60/203,081, filed May 9, 2000, entitled "Internet platform for creating and supporting communities".

Bruce Halberg et al, "Using Microsoft Excel 97", Published 1997, Bestseller Edition, Pertinent pp. 1-9, 18-25, 85-89, 98-101;106-113, 124-127, 144-147, 190-201, 209-210, 218-227, 581-590, 632-633, 650-655, 712-714.

Excel Developer Tip (hereinafter "Excel"), "Determining the Data Type of a Cell", May 13, 1998, p. 1 (available at http://jwalk.com/ss//excel/tips/tip62.htm).

Han et al., WebSplitter: A Unified XML Framework for Multi-Device Collaborative Web Browsing, 2000, ACM Conference on Cimputer Supported Cooperative Work, 10 pages.

IBM; Stack Algorithm for Extractin Subtree from Serialized Tree, Mar. 1, 1994, TDB-ACC-NONN94033, 3 pages.

Ixia Soft, "Streamlining content, retrieval, and publishing ont he Web using TEXTML Server and SML Spy 4 Suite in an Integrated, Web publishing environment," (Partner's Whitepaper, published on the Web as of Jun. 6, 2002, downloaded pp. 1-16.

Kutay, U.S. Appl. No. 60/209,713, filed Jun. 5, 2000, entitled, "Methods and systems for accessing, organizing presenting and viewing data".

LeBlond et al, "PC Magazine Guide to Quattro Pro for Windows", pp. 9-11, 42-61, Ziff-Davis Press, Copyright 1993 by the LeBlond Group.

Mansfield, "Excel 97 for Busy People", Published by Osborne/McGraw-Hill 1997 pp. 48-50.

"Microsoft Visual Basic 5.0 Programmer's Guide 1997"; pp. 578-579; Redmond WA 98052-6399.

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

U.S. Appl. No. 60/209,713, filed Jan. 1, 1990, Kutay et al.

"Architecture for a Dynamic Information Area Control" IBM Technical Disclosure Bulletin, IBM Corp. New Yrok US, vol. 37 No. 10, Jan. 10, 1994, pp. 245-246.

"Netscape window" Netscape Screenshot Oct. 2, 2002.

Alschuler; "A Tour of Xmetal" O'Reilly XML.COM 'Online Jul. 14, 1999 XP002230081 retrieved from the internet Feb. 5, 2003: <URL:http//www.xml.com/pub/a/SeyboldReport/ip0311025.html>.

Au et al.; "Netscape Communicator's Collapsible Toolbars" CHI'98 Human Factors in Computing Systems Conference Proceedings, Los Angeles CA, Apr. 1998, pp. 81-86.

Battle et al., "Flexible Information Presentation with XML" 1998 The Institution of Electrical Engineers, 6 pages.

Brogden ; "Arbortext Adept 8 Editor Review" O'Reilly XML.COM 'Online! Sep. 22, 1999 XP002230080 retrieved from the Internet Feb. 5, 2003; <URL:http://www.xml.com/pub/a/1999/09/adept/AdeptRvw.htm>.

Chen, Yi et al.; "XKvalidator: A Constraint Validator for XML" CIKM '02, Copyright 2002, ACM 1-58113-492-4-02-0011, Nov. 2002, pp. 446-452.

Cheng, Ya Bing et al.; "Designing Valid XML Views" ER 2002, LNCS 2503 2002, Springer-Verlag Berlin Heidelberg 2002. pp. 463-477.

Chien, Shu-Yao et al.; "Efficient Management of Multiversion Documents by Object Referencing" Proceedings of the 27th VLDB Conference, 2001, pp. 291-300.

Chien, Shu-Yao et al.; "Efficient Schemes for Managing Mulitversion XML Documents" VLDB Journal, 2002, pp. 332-352.

Chien, Shu-Yao et al.; "Storing and Querying Multiversion XML Documents using Durable Node Numbers" IEEE 2002, pp. 232-241.

Chien, Shu-Yao et al.; "XML Document Versioning" SIGMOD Record vol. 30 No. 3, Sep. 2001, pp. 46-53.

Chuang, Tyng-Ruey; "Generic Validation of Structural Content with Parametric Modules" ICFP '01, Sep. 2001, Copyright 2001, ACM 1-58113-415-0/01/0009, pp. 98-109.

Ciancarini, Paolo et al.; "Managing Complex Documents Over the WWW: A Case Study for XML" Transactions on Knowledge and Data Engineering, vol. I. 11 No. 4, Jul./Aug. 1999. pp. 629-938.

Clark, James; "XSL Transformation (XSLT) Version 1.0" W3C (MIT Inria Kejo), Nov. 16, 1999 pp. 1-156.

Clarke, P.; "From Small Beginnings" Knowledge Management Nov. 2001, pp. 28-30.

Davidow; "XML Editors: Allegations of Functionality in Search of Reality" Internet 'Online! 1999 XP002230082 retrieved from the Internet <URL:http://www.ivritype.com/xml/>.

Dayton et al.; "Photo Shop 5/5.5 Wow! Book" 2000 Peachpit Press pp. 8-17.

Description of Whitehill Composer software product producted by Whitehill Technologies Inc. available at <http://www.xml.com/pub/p/221> accessed on, Apr. 2004, two pages.

Dyck; "XML Spy Tops as XML Editor" http://www.eweek.com/article2/0395972404100.asp Nov. 2002, 4 pages.

Hall; "Agent-based Software Configuration and Deployment" Thesis of the University of Colorado Online, Dec. 31, 1999, retrieved from the Internet on Nov. 7, 2003: <http://www.cs.colorado.edu/users/rickhall/documents/ThesisFinal.pdf> 169 pages.

Hardy et al.; "Mapping and Displaying Structural Transformations between XML and PDF" DocEng '02, Nov. 8-9, 2002, Copyright 2002, ACM 1-58113-597-7/02/0011, pp. 95-102.

Haukeland ; "Tsbiff—tildeslash biff—version 1.2.1" Internet Document [Online] Jun. 1999 URL: http://web.archive.org/web/199909l2001527/http://www.tildeslash.com/tsbiff/.

Hwang et al.; "Micro-Firewalls for Dynamic Network Security with Distributed Intrusion Detection"; IEEE INternational Symposium on Network Computing and Applications; 2001; pp. 68-79.

Kaiya et al.; "Specifying Runtime Environments and Functionalities of Downloadable Components Under the Sandbox Mode"; International Symposium on Principles of Software Evolution; 2000; pp. 138-142.

Kanemoto Hirotaka et al; "An Efficiently Updatable Index Scheme for Structured Documents" IEEE, 1998, pp. 991-996.

Kim, Sangg-Kyun et al.; "Immediate and Partial Validation Mechanism for the Conflict Resolution of Update Operations in XML Databases" WAIM 2002, LNCS 2419, 2002, Springer-Veriag Berlin Heidelberg 2002, pp. 387-439.

Komatsu, N. et al. A proposal o; "A Proposal on Digital Watermark in Document Image Communication and Its Application to Realizing a Signature" Electronics and Communications in Japan Part I: Communications vol. 73 No. 5, May 1990, pp. 22-33.

McCright, J.S.; "New Tool Kit to Link Groove with Microsoft Sharepoint" eWeek Enterprise News & Reviews Ziff Davis Media Inc., Jul. 2002, 1 page.

Musgrave; "Networking Technology—Impact and Opportunities" Survey and Statistical Computing 1996, Proceedings of the Second ASC International Conference, Sep. 1996, pp. 369-378. London UK.

Nelson, Mark; "Validation with MSXML and XML Schema" Windows Developer Magazine, Jan. 2002, pp. 35-38.

"SmartUpdate Developer's Guide" Netscapte Communication Corporation, Online Mar. 11, 1999 retrieved from the Internet on Dec. 8, 2000: http://developer.netscape.com:80/docs/manuals/communicator/jarman/index.htm> 83 pages.

"Netscape Communicator 4.61 for OS/2 Warp" Netscapte Communication Corporation, Software 1999, The whole software release & "Netscape—Version 4.6 [en]-010615" Netscape Screenhot Oct. 2, 2002.

Noore, A.; "A Secure Conditional Access System Using Digital Signature and Encryption" 2003 Digest of Technical Paper, International Conference on Consumer Electronics, Jun. 2003, pp. 220-221.

Pacheco et al.; "Delphi 5 Developer's Guide" Sams Publishing, 1999, Chapter 31,Section: Data Streaming, 6 pages.
Prevelakis et al.; "Sandboxing Applications"; Proceedings of the Freenix Track;2001; pp. 119-126.
Rapaport; "Gel more from SharePoint" Transform Magazine, vol. 11 No. 3 Mar. 2002, pp. 1315.
Rogge Bories et al.; "Validating MPEG-21 Encapsulated Functional Metadata" IEEE 2002, pp. 209-212.
Schmid et al.; "Protection Data from Malicious Software"; 18th Annual Computer Security Application Conference; 2002; pp. 199-208.
Sun Q. et al.; "A robust and Secure Media Signature Scheme for JPEG Images" Proceedings of 2002 IEEE Workshop on Multimedia Signal Processing, Dec. 2002, pp. 296-299.
Sutanthavibul Supoj et al.; "XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].
Tomimori et al.; "An Efficient and Flexible Access Control Framework for Java Programs in Mobile Terminals"; 22nd International Conference on Distributed Computing Systems Workshops; 2002; pp. 777-782.
Usdin, et al.; "XML: Not a Silver Bullet But a Great Pipe Wrench" Standardview vol. 6. No. 3, Sep. 1998, pp. 125-132.
Van Hoff et al.; "The Open Software Description Format" Online Aug. 13, 1997, retrieved from the Internet on Nov. 7, 2003: <http://www.w3.org/TR/NOTE-OSD>, 11 pages.
Verlamis Iraklis et al.; "Bridging XML-Schema and relational databases. A System for generating and manipulating relational databases using valid XML documents." DocEng '01, Nov. 9-10, 2001, Copyright 2001, ACM 1-58113-432-0/01/0011, pp. 105-114.
Clark, J. et al.; "XML Path Language (XPath) Version 1.0" W3C (MIT Inria Kejo), Nov. 16, 1999, pp. 1-49.
"Whitehill Composer" Whitehill Technologies Inc. 2 pages.
Williams et al.; "The Component Object Model" A Technical Overview Microsoft Corp., Oct. 1994, pp. 1-14.
Wong, Raymond K. et al.; "Managing and Querying Multi-Version XML Data with Update Logging" DocEng '02, Nov. 8-9, 2002, Copyright 2002, ACM ACM 1-58113-594-7/02/0011, pp. 74-81.
Microsoft Corporation, "Microsoft Computer Dictionary" Microsoft Press, Fifth Edition, p. 149.
"Webopedia Computer Dictionary" retrieved on May 9, 2006, at <<http://www.pewebopedia.com/TERM/OLE.html>>, Jupitermedia Corporation, 2006, pp. 07.
"Store and Organize Related Files in a Binder," Getting Results with Microsoft Office, 1990, pp. 109-112.
Barker et al., "Creating In-Line Objects Within An Integrated Editing Environment," IBM Technical Disclosure Bulletin, vol. 27, No. 5, Oct. 1984, p. 2962.
Berg A., "Naming and Binding: Monikers" Inside OLE, 1995, Chapter 9, pp. 431-490.
Clapp D., "The NeXT Appliction Kit Part I: Non-Responsive Classes," The NeXT Bible 1990, Chapter 16, pp. 275-293.
DiLascia et al., "Sweeper" Microsoft Interactive Developer, vol. 1, No. 1, 1996, 27 pages.
Herzner et al., "CDRAM- Compound Document Access and Management. An Object-Oriented Approach" Multimedia Systems Interactions and Applications, 1992, Chapter 3, pp. 17-36.
Kobayashi et al., "An Update on BTRON-specification OS Development" IEEE 1991 pp. 132-140.
Peterson B., "Unix Variants," Unix Review, vol. 10, No. 4, Apr. 1992, pp. 29-31.
Pike et al., "Plan 9 from Bell Labs" UKUUG, Summer 1990, 10 pages.
Pike et al., "The Use of Name Spaces in Plan 9," Operating Systems Review Vol. 27, No. 2, Apr. 1993, pp. 72-76.
Staneck W., "Internal and External Media", Electronic Publishing Unleashed, 1995, Chapter 22, pp. 510-542.
OMG XML Metadata Inerchange (XMI) Specification Version 1.2 Jan. 2002.
Trupin J., "The Visual Programmer," Microsoft Systems Journal, Apr. 1996, pp. 103-105.

Zdonik S., "Object Management System Concepts," ACM, 1984, pp. 13-19.
Cybook, Inc.: "Copying the Search Form to Services-based Web Sites" INternet Article, (online) Jul. 26, 2004.*the whole document*.
Macromedia, Inc.: "Dreamweaver Technote, Changes in Copying and pasting in Dreamweaver 4" Internet Article (online). *the whole document*.
Rado, Dave: "How to create a template that makes it easy for users to "fill in the blanks", without doing any programming" Microsoft Word MVP Faq Site, (online) Apr. 30, 2004, the whole document.
Cover, XML Forms Architecture, retrieved at << http://xml.coverpages.org/xfa.html>> on Aug. 17, 2006, Coverpages, Jun. 16, 1999.
Raggett, "HTML Tables", retrieved on Aug. 6, 2006, at <<http:www.//is-edu.hcmuns.edu.vn/WebLib/books/Web/Tet/html3-tables.html>>, W3C Internet Draft, Jul. 7, 1995, pp. 1-12.
Pacheco, Xavier et al., "Delphi 5 Developer's Guide", Sams Publishing. Chapter 31, Section: Data Streaming,(1999),4.
Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).
Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).
Dubinko, Micah "XForms and Microsoft InfoPath", Retrieved from the Internet at http://www.xml.com/lpt/a/1311 on Jan. 21, 2007,(Oct. 29, 2003).
Udell, Jon "InfoPath and XForms", Retrieved from the Internet at http://weblog.infoworld.com/udell/2003/02/26.html,(Feb. 26, 2003).
Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).
Singh, Darshan "Microsoft InfoPath 2003 By Example", Retrieved from the Internet at http://www.perfectxml.com/InfoPath.asp on Jan. 21, 2007,(Apr. 20, 2003).
Raman, T.V., et al., "XForms 1.0", (Dec. 2001),Section 1-12.2.3 & Appendices A-G.
"Enter Key", Retrieved from the Internet at http://systems.webopedia.com/TERM/Enter_key.html on Dec. 20, 2006.
Lehtonen, Miro et al., "A Dynamic User Interface for Document Assembly", Department of Computer Science, University of Helsinki,(Nov. 2002).
Rees, Michael J., "Evolving the Browser Towards a Standard User Interface Architecture", School of Information Technology, Bond University, Australia,(2001).
"Microsoft Visual Basic 5.0 Programmer's Guide", *Microsoft Press*, (1997), pp. 42-43, 54-58.
Nelson, Joe "Client-side Form Validation Using JavaScript", *Developer Advisory*, (Sep. 21, 2001).
Brabrand, et al., "Power Forms Declarative Client-side Form Field Validation", (2002), 1-20.
Anat, Eyal et al., "Integrating and Customizing Hererogeneous E-Commerce Applications", The VLDB Journal-The International Journal on Very Large Data Bases, vol. 10, Issue 1, (Aug. 2001), 16-38.
Adams, Susie et al., "BizTalk Unleashed", Sams publishing, 2002, first printing Mar. 2001,(3/2001), 1-2, 31-138.
Vasters, Clemens F., "BizTalk Server 2000 A Beginner's Guide", Osborne/McGraw-Hill,(2001), 1-2, 359-402.
Halberg, Bruce et al., "Using Microsoft Excel 97", (1997), 191-201, 213-219.
Villard, et al., "An Incremental XSLT Transformation Processor for XML Document Manipulation", http://www2002.org/CDROM/refereed/321, Printed on May 18, 2007,(May 2002), 25 pages.
Borland, Russo "Running Microsoft Word 97", 314-315, 338, 361-362, 390, and 714-719.
"Microsoft Word 2000", Screenshot, (1999), 1-5.
XMLSPY, "XmlSpy 2004 Enterprise Edition Manual", Altova,(May 17, 2004), 1-25, 220-225.

Stylusstudio, "StylusStudio: XPath Tools", 2004-2007, StylusStudio, 1-14.

Dodds, "Toward an XPath API", xml.com,(May 7, 2001), 1-3.

Altova, "Altova Tools for XPath 1.0/2.0", Altova, 1-12.

"Microsoft Word 2000 Screenshoots", Word,(2000), 1-17.

Grosso, et al., "XML Fragment Interchange", W3C,(Feb. 2001), 1-28.

Altova, et al., "User and Reference Manual Version 4.4", www.xmlspy.com, May 24, 2007, 1-565.

"X-Form 1.0", W3C,(Jul. 16, 2001).

"Microsoft Word 2000 Screenshots", (2000), 11-17.

* cited by examiner

Extension Tag

```
<edf:extension
  urn = "urn:HelloNetDocs.netdocs.com"
  name = "HelloNetDocs"
  version = "1.0.0.0"
  lastUpdate = "2000-01-15 8:43:52"
  description = "Hello NetDocs"
>
  (...)
</edf:extension>
```

*Fig. 4*

EDF Schema

```
<?xml...>
<!--info about the extensions and linked extensions -->
<edf:extension ...>

<edf:edfLink ... />

<!-- UI extensions -->
    <edf:toolbars> ... </edf:toolbars>
    <edf:accelerators> ... </edf:accelerators>
    <edf:menuItems> ... </edf:menuItems>
    <edf:commandGroups> ... </edf:commandGroups>
    <edf:themes> ... </edf:themes>

<!-- Objects, Components and Behavior Extensions -->
    <edf:Services> ... </edf:Services>

<!-- LocalStore Extensions -->
    <edf:contentClasses> ... </edf:contentClasses>
    <edf:subscriptions> ... </edf:subscriptions>

</edf:extension>
```

*Fig. 5*

Package Manifest

```
<?xml version "1.0" ?>
<Package Size=" ... " >
    <Files>
        <Group Name = "required">
            <File Name="bar.dll" />
            <File Name="foo.dll" Hash=" ... "/>
                <Dependencies>
                    <File Name="bar.dll" />
                </Dependencies>
                <COMClass ClassID=" ... " />
            </File>
            <File Name="myextension.edf" Hash=" ... "/>
            <File Name="errorhandling.gif" Hash=" ... "/>
        </Group>
        <Group Name = "offline">
            <File Name="bar.xml" Hash=" ... "/>
            <File Name="abc.gif" Hash=" ... "/>
            <File Name="xyz.gif" Hash=" ... "/>
            <File Name="foo.htm" Hash=" ... "/>
        </Group>
        <Group Name = "ondemand">
            <File Name="foo2.htm" Hash=" ... "/>
        </Group>
    </Files>
</Package>
```

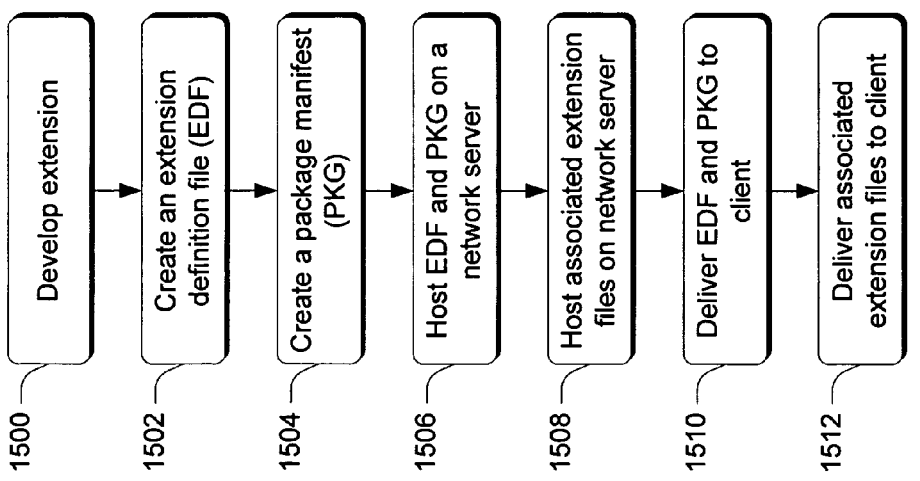

ARCHITECTURES FOR AND METHODS OF PROVIDING NETWORK-BASED SOFTWARE EXTENSIONS

RELATED APPLICATIONS

This is a continuation of U.S. patent application Ser. No. 09/599,812, filed Jun. 21, 2000, now U.S. Pat. No. 6,874,143. In addition, the following patent applications are related to the present application, are assigned to the assignee of this patent application, and are expressly incorporated by reference herein:

U.S. patent application Serial No. 09/599,298, entitled "Single Window Navigation Methods and Systems", and filed on the same date as this patent application;

U.S. patent application Ser. No. 09/599,806, entitled "Methods and Systems of Providing Information to Computer Users", and filed on the same date as this patent application, now U.S. Pat. No. 6,948,135;

U.S. patent application Ser. No. 09/599,299, entitled "Methods, Systems, Architectures and Data Structures For Delivering Software via a Network", and filed on the same date as this patent application, now U.S. Pat. No. 6,883,168;

U.S. patent application Ser. No. 09/599,048, entitled "Network-based Software Extensions", and filed on the same date as this patent application, now U.S. Pat. No. 7,000,230;

U.S. patent application Ser. No. 09/599,813, entitled "Authoring Arbitrary XML Documents Using DHTML and XSLT", and filed on the same date as this patent application, now U.S. Pat. No. 7,191,394;

U.S. patent application Ser. No. 09/599,086, entitled "Task Sensitive Methods And Systems For Displaying Command Sets", and filed on the same date as this patent application.

TECHNICAL FIELD

This invention relates to methods and systems for providing software via a network. More specifically, the invention pertains to Internet-based delivery of software.

BACKGROUND

Installation of traditional PC applications requires physical media, such as a disk or CD-ROM that must be physically inserted into a computer in order for software to be loaded onto a user's computer. Typically, this process requires the user to enter settings information that can be confusing to the user. Once the software is installed, it is typically fixed in terms of its location and functionality. When the software is updated, the user must typically purchase additional physical media and repeat the installation process so that they can use the updated software. In this model, the software is fixed in its association with the computer on which it was installed. If a user moves to another computer, they will not be able to use the specific software on their machine without repeating the installation process.

As computing continues to evolve into the environment of computer networks such as the Internet, it has become clear that the traditional software delivery model described above is inadequate to meet the demands of consumers who desire dynamic, flexible, and adaptable software on-demand. Network-based software delivery is becoming the subject of increasing focus by those who develop and deliver software. Unlocking the potential for network-based software delivery will require smart, innovative and streamlined solutions, especially in situations where bandwidth may be limited.

Accordingly, this invention arose out of concerns associated with providing new software delivery models that are particularly well-suited for network-based software delivery, e.g. delivery via the Internet.

SUMMARY

Methods and systems for network-based software delivery are described. In one embodiment, an application program or software platform resides on a client. The program or platform is configured so that it is extensible based on software extensions that are deliverable over a network such as the Internet. Various extensions can be developed by third party developers for incorporation into the program or platform.

In one described embodiment, extension files that comprise a software extension are hosted on a network server such as an Internet server. These include descriptor files that describe aspects of the software extension. These descriptor files logically describe an extension to the program or platform and designate the location of other extension files. Extensions are incorporated on a client by navigating to a particular network or Internet site through which the extensions can be accessed. The files describing the extension files are downloaded on the client. These files tell the client where, when and how the particular extension can be plugged into the program or platform, as well as where to find the appropriate extension files and how to download them. The extension files are then downloaded and incorporated into the platform.

In one embodiment, an inventive software architecture is provided for handling and consolidating particular types of descriptive files associated with various extensions. A filtering mechanism called attachment points, is used to create handlers for the different descriptive types of files that define a software extension. Each of these handlers is known as an attachment manager. Attachment managers are provided for each extensible feature type. The attachment managers interpret data from extensions files which are supplied by attachment points. In addition to predefined attachment managers, custom attachment managers can be created using data from attachment points. When an extension extends a particular feature type, the attachment points ensure that only the appropriate attachment manager is notified so that the feature type can be incorporated into the program or platform efficiently.

BRIEF DESCRIPTION OF THE DRAWINGS

FIG. 4 shows a portion of an EDF in accordance with the described embodiment.

FIG. 5 shows a portion of an EDF schema in accordance with the described embodiment.

FIG. 6 shows a portion of a PKG in accordance with the described embodiment.

FIG. 15 is a flow diagram of steps in a method in accordance with the described embodiment.

FIG. 16 shows a portion of an exemplary catalog structure in accordance with the described embodiment.

DETAILED DESCRIPTION

Overview

The methods and systems described just below provide a mechanism by which functionality can be added dynamically to an application program or software platform. Functionalities or "extensions" as they will be referred to, can be advantageously added via a network such as the Internet. Extensions, that can implement new features or add to existing features, can be added using only a network address, such as a URL, as a basis for extension installation. That is, all of the files that comprise an extension can be maintained on the network and accessed via one or more network sites.

Extensions can be described in a variety of ways. One way utilizes a hierarchical tag-based language which facilitates handling and use of the various extensions. In one particular implementation, a software platform is provided that can incorporate various functionalities. The software platform and the inventive architecture described below enable third and fourth party developers to develop extensions for the platform that can be easily and seamlessly incorporated into the platform without having any knowledge of (or relationship with) a hosting service. A third party developer is a developer who develops an extension for the platform. A fourth party developer might be a developer who develops an extension to a third party developer's extension. Thus, the incorporation of third and fourth party extensions is essentially a transparent process, as far as developers are concerned.

Figure 1:
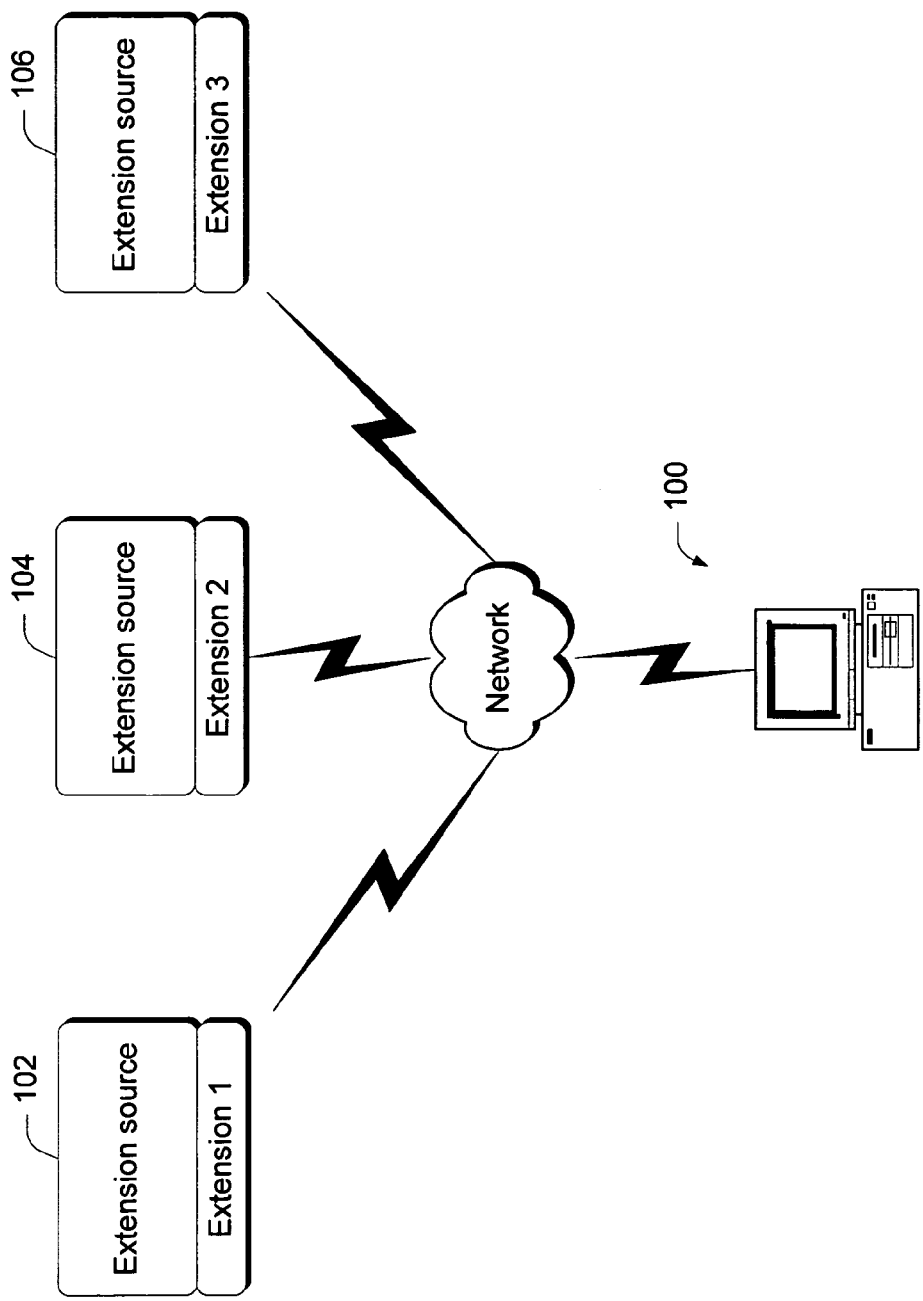
FIG. 1 is a high level view of a system that can be utilized in accordance with one described embodiment.

Consider for example, FIG. 1 which shows a user's computer 100 and several so-called extension sources 102, 104, and 106. The extension sources can comprise any entity from which a software extension can be obtained via a network. In an exemplary implementation, the network can comprise the Internet, although other networks (e.g. LANs and WANs) can certainly be utilized. Extension sources can include, without limitation, business entities such as retail stores that might maintain a network site. In one implementation, a user can execute software on their computer that provides an application program or software platform. In this document, the terms "application program" and "software platform" will be used interchangeably. Each of the different extension sources 102-106 can provide software extensions that can plug into the software platform that is executing on the user's machine. These extensions are deliverable via a network such as the Internet, and assist in providing applications that can be executed on the user's machine. In the described embodiment, the extensions are logically described in XML which is in line with emerging industry standards. Additionally, the use of XML assists in the future discoverability of extensions by promoting XML DOM properties on the Internet. It will be appreciated, however, that any suitable format can be used for describing the extensions, e.g. a binary description could be used.

Extensions can be delivered from any number of different extension sources. The inventive methods and systems provide a streamlined and organized way to handle the provided extensions. The use of XML advantageously enables efficient handling of extensions from multiple different extension sources, without unduly taxing the software components that utilize specific portions of an extension or extensions.

In one particular implementation, the software platform on the user's machine provides various different integrated functionalities that enable a user to accomplish different document-centric tasks. An exemplary system is described in the U.S. patent application entitled "Single Window Navigation Methods and Systems", incorporated by reference above.

Exemplary Computer Environment

The embodiment described just below can be employed in connection with various computer systems. A computer system, for purposes of this document, can be considered as any computing device that includes some type of processor, i.e. a microprocessor, and some type of operating system. Thus, a computer system can be construed to include, without limitation, traditional desktop computers, more powerful servers, various hand-held devices such as cell phones, pocket-held computer devices and the like.

Figure 2:
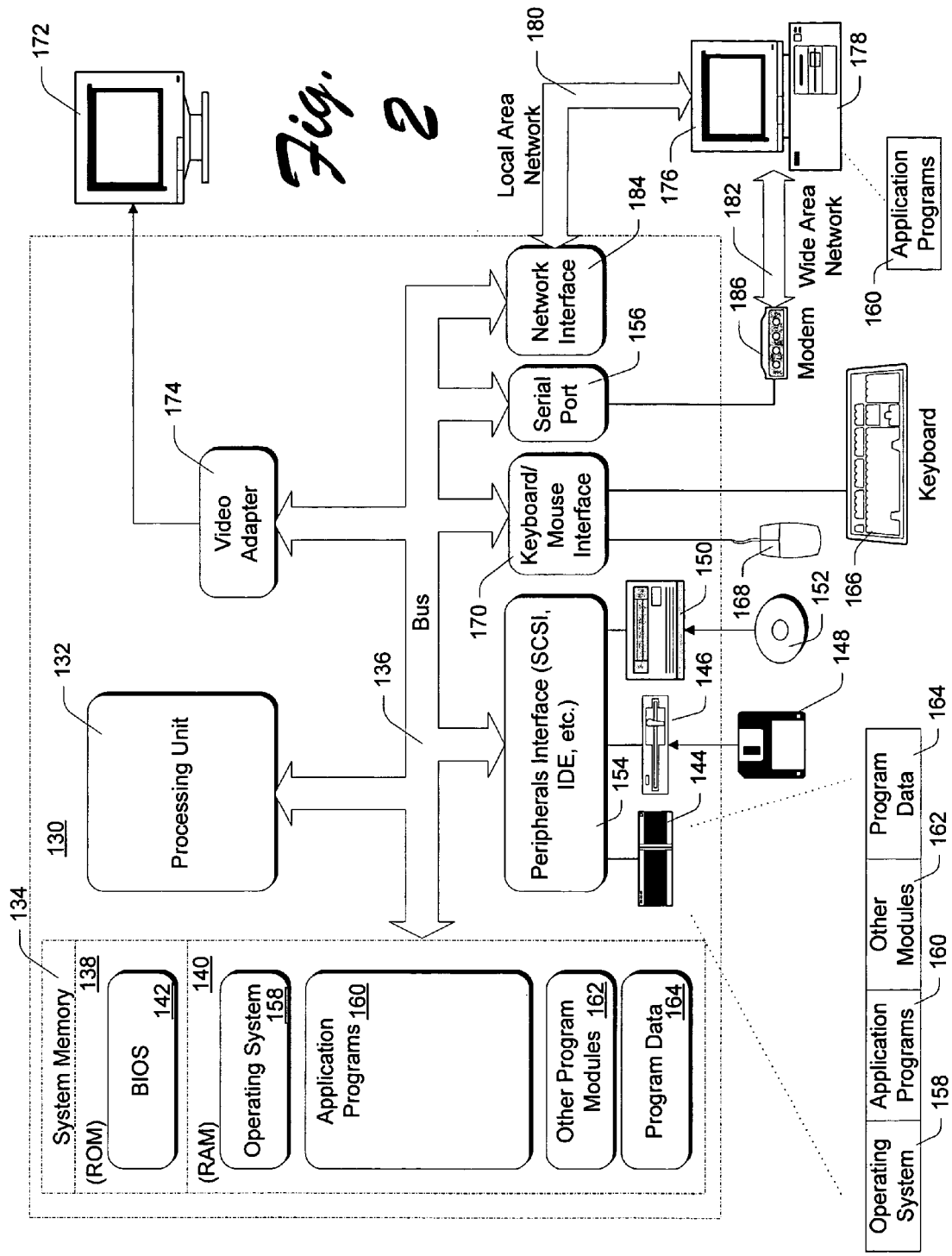
FIG. 2 is an exemplary computer system that can be utilized in accordance with the described embodiment.

FIG. 2 shows but one exemplary computer system that can be used to implement the embodiments described herein. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Extensions

An "extension", as used in this document, will be considered to include, without limitation, software functionality and content that can be added to an application program or software platform. These additions typically provide some type of functionality that the application program may not have had before the extension was incorporated, or alter the behavior of at least one existing feature. The extension is incorporated or integrated directly into the application program in a way that changes, to some degree, the manner in which the application program behaves or operates. Extensions provide dynamically added content and can provide applications (such as an email application), plug-ins to extend existing applications (like a fax plug-in to an email application), or simply web pages, to name just a few.

In the described embodiment, extensions are described using XML, an industry-standard, text-based markup language. XML greatly facilitates the extensibility of software content. Specifically, various extensions can be authored by third parties and described in XML in a manner that enables the extensions to be readily integrated into application programs. It should be appreciated, however, the XML constitutes but one exemplary way of describing and using the extensions. Other ways can, of course, be used.

Exemplary Extension Organization

In the described embodiment, extensions are organized in three separate but related portions: an Extension Definition File (EDF), a Package Manifest (PKG), and the code, components, or "bits" that make up or define the extension. An EDF can be, but need not be associated with a URL (Universal Resource Locator) that provides a way for a client to access the EDF. By convention and choice, the PKG file is located at the same URL as the EDF. It will be appreciated that the described EDFs and PKG are each not required for the other to be used. It just so happens that, in the example that is given is this document, the two are employed together. To that end, each of these features can be separately and independently employed.

EDFs describe logical attachments to an application program or software platform, while PKGs specify the physical files and resources that are used in an extension. There can be a one to one correspondence between EDFs and PKGs.

Figure 3:
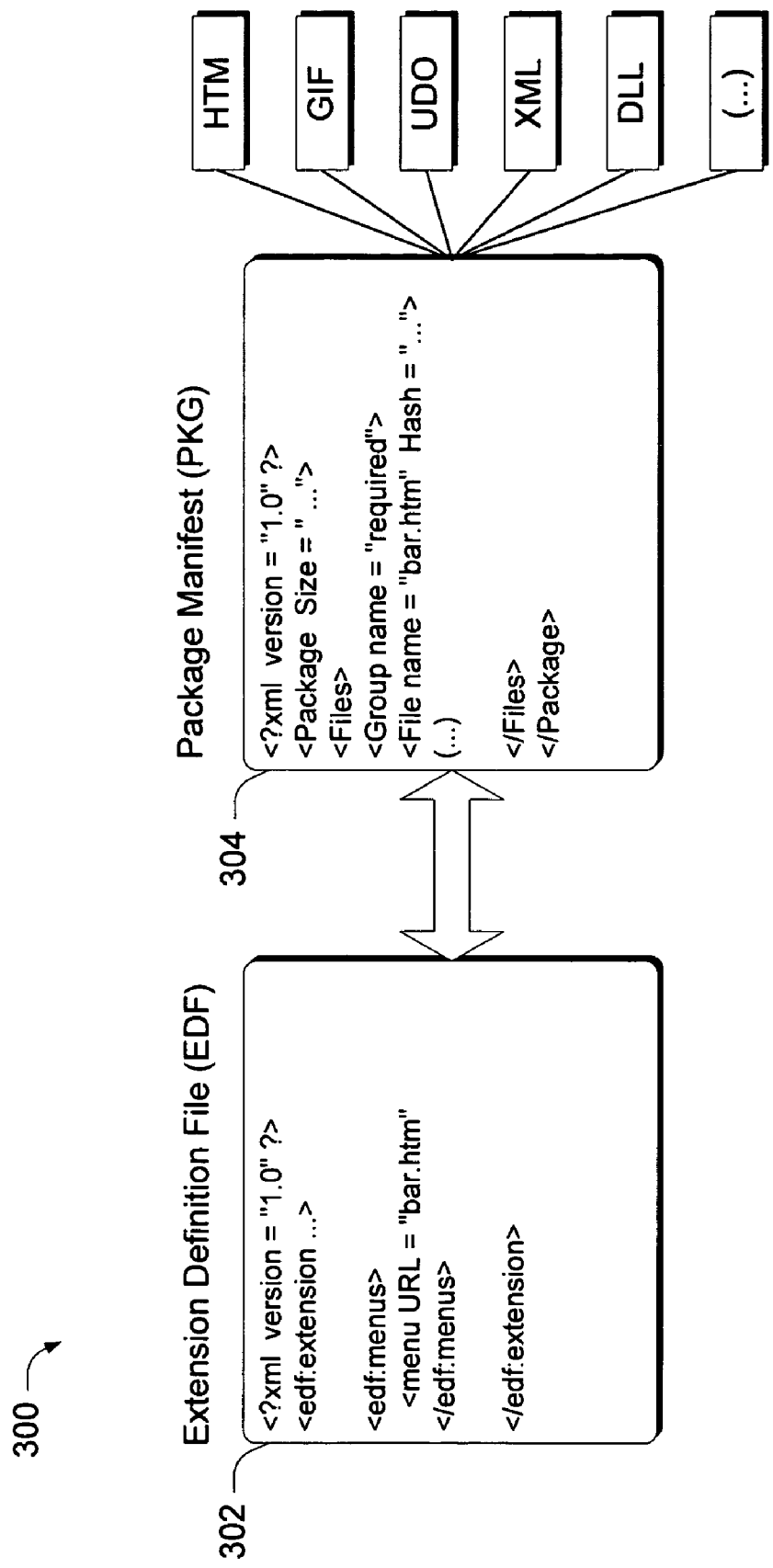
FIG. 3 is a diagram of an exemplary EDF and PKG in accordance with one described embodiment.

FIG. 3 shows an exemplary organization 300 that includes an EDF 302 and a corresponding package manifest (PKG) 304. In the illustrated example, the EDF 302 uses XML to describe the logical attachments or extensions to an application program. The corresponding PKG 304 specifies the physical files and resources that are associated with a particular extension. Exemplary file types are shown to the right of PKG 304 and include, without limitation, HTM, GIF, UDO, XML, DLL, and various other types of files.

Extension Definition File (EDF)

In the described example, an EDF is an XML file that logically describes an extension. For example, the EDF can describe HTML that makes up a user interface (UI), the objects that contain code for implementing various functions, and the like. The EDF can also contain all or part of the functionality that comprises an extension. For instance, the HTML that describes a toolbar could be incorporated directly into an EDF file, and a toolbar attachment manager could read it from the EDF file, instead of from a URL. The information contained in the EDF is processed and (together with the information contained in the PKG), the appropriate files are automatically installed on a user's computer. This is done unobtrusively without manipulating the computer's persisted settings, as might be found in the user's system registry.

An EDF, implemented in XML, contains various tags that are associated with various extensions. The various tags can correspond to:

- User interface elements
- Behaviors/Components/Objects
- Store Elements
- User-defined objects
- Or anything else that represents a point of extensibility in the application or platform EDFs advantageously have an "open schema" which means that third party developers can extend the extension mechanism and include their own extensions by creating their own tags. Additionally, extensions can themselves be extended by other developers. EDFs can also have one or more predefined tags. Exemplary predefined XML tags for user interface elements can include tags for feature types such as: tool bars, accelerators, menu items, and themes. These feature types are utilized in the single navigable window application incorporated by reference above and defined in the table immediately below:

TABLE 1

| Feature Type | Definition |
| --- | --- |
| Tool Bars | Horizontal command containers above the document area. |
| Accelerators | Keyboard shortcuts for commands |
| Menu Items | Pop-up or drop-down menu choices that third parties can add to well-known, named menu attachments in the platform |
| Themes | A data-driven way to provide overrides for well-known resources of the platform, such as default buttons or default style sheet |

Exemplary predefined XML tags for behaviors/components/objects include tags for Services. These feature types are utilized in the single navigable window application incorporated by reference above and defined in the table immediately below:

TABLE 2

| Feature Type | Definition |
| --- | --- |
| Services | Services are objects that extend existing objects (such as the application, window, or document) in the application or platform's Object Model. For example, editing functions use Object Model Attachments attached to the window or document that maintain document context and editing state per-window. These can also include Object Model Attachments attached to the application (such as a spellchecker dictionary object) |

Exemplary predefined XML tags for store elements include tags for content classes and offline data sources. These feature types are utilized in the single navigable window application incorporated by reference above and defined in the table immediately below:

TABLE 3

| Feature Type | Definition |
| --- | --- |
| Content Classes | Allow extension writers to define new types of XML documents with new schemas. |
| Offline Data Sources | Allow for extension writers to define store replication instructions in an EDF. |

EDF Schema

In the described embodiment, the EDFs have a particular XML schema that is utilized. The schema comprises collections of XML tags that are arranged in a hierarchical organization to facilitate information dissemination to software components that need certain extensions. In the described embodiment, the outer (encompassing tag) for EDFs is an "extension" tag.

FIG. 4 shows an exemplary extension tag. "extension" tags can include one or more of the following attributes, all of which are optional:

TABLE 4

| Attribute | Definition |
| --- | --- |
| urn | ID for the extension. It allows extension writers to specify relative locations for content in EDFs without using relative paths or fixed URLs. It also allows hosting administrators to move around extensions on servers without breaking any links. |
| name | Name that can be used in a status bar or message display |
| version | Vendor-determined version number for the extension. |
| lastUpdate | Date/time that the EDF was last modified. |
| description | Brief description of the extension. |

Within the "extension" outer tag are one or more child tags, also referred to as "top level tags". These top level tags are each associated with a feature type that can be added by a particular extension. Exemplary feature types are discussed in connection with Tables 1-3 above. Underneath each top level tag there can be one or more child tags that are individually associated with a particular feature of the feature type that is to be added by a particular extension.

FIG. 5 shows an exemplary XML schema organization in accordance with this embodiment. For each top level tag in an EDF, there is an associated attachment manager which is a software component that receives data associated with the tag so that the data can be used to incorporate the extension into the platform or application program. Different attachment managers may interpret the data from the tag in different ways to provide different types of extensibility, so different top level tags will contain different types of data in different structures. This will become more evident in the "Architecture" section below. Note that the "edf:" XML namespace qualifier enables support of an open schema where extensions can provide their own tags and corresponding attachment managers. Tags within the edf namespace are used by built-in attachment managers in the application or software platform. Tags in other namespaces are used by third-parties to provide additional points of extensibility.

Package Manifest (PKG File)

Package Manifest Definition

In the described embodiment, a package manifest (PKG file) comprises a list of files that are utilized in a package. The list is advantageously compressed somewhat and digitally signed. Each package manifest can contain a list of one or more files each of which can include an associated hash, as well as download directives that control caching of the files. Once an extension is authored, a software tool can be used to generate the package manifest.

In addition, the package manifest can specify several other pieces of information:

File Group

All files in an extension can be labeled according to a number of predefined file groups. The file group of a particular file determines when the particular file gets downloaded, where it is stored on the client, and how it gets packaged. In the described embodiment, four predefined file groups are provided and are listed and described in the table immediately below:

| Group name | When downloaded | Where stored on the client | Packaging | Content |
|---|---|---|---|---|
| Required | Downloaded before any other files in the extension. | NetDocs package cache | All required files in an extension are packaged together as a CAB* file. | DLLs included so that a user will not have to wait for a prolonged period of time before clicking on a UI element |
| Offline | Offline files start getting downloaded as soon as Required are down. Providing the user stays on line long enough, these files will all get downloaded and will later be available for offline use. | NetDocs package cache | File are sent down individually. | Bulk of the UI files. |
| On demand | Only downloaded when they are requested for the first time. | NetDocs package cache | Files are sent down individually. | To avoid using up disk space on the client, advanced features can be put in this category. |
| Online only | Downloaded on demand. Content is only available when the user is online. | WinInet Cache | Files are sent down individually | Content that is not to be provided offline. Examples include help pages and other content that can consume a large amount of disk space. |

*CAB stands for the CABinet technology that Internet Explorer uses to package bits for download. CAB files average from 2 to 3:1 compression, and are optimized for quick expansion. CAB files have the added security benefit that they are easily signed.

File Download Priority

Files in each group are listed according to the order in which they should be downloaded. This download order is implicit in the ordering of the files in the package manifest, an example of which is shown in FIG. 6.

Hash Value for Security/Versioning

Individual files in the package manifest can have an associated hash value. Each hash value is generated by running the file through an encryption algorithm. An exemplary encryption algorithm is Microsoft's CryptoAPI. In the illustrated example, each file can be listed with a base 64-encoded hash value, so that the file can be validated once the content arrives at the client. Specifically the package manifest is sent to the client in a secure manner (i.e. it is digitally signed). The package manifest contains the hash values for individual files. When the individual files are received by the client, each of the files can be run through the same CryptoAPI that was used to provide the hash values in the package manifest. If the hash values for a particular file compare favorably, then the file has not been altered and is secure.

Figure 7:
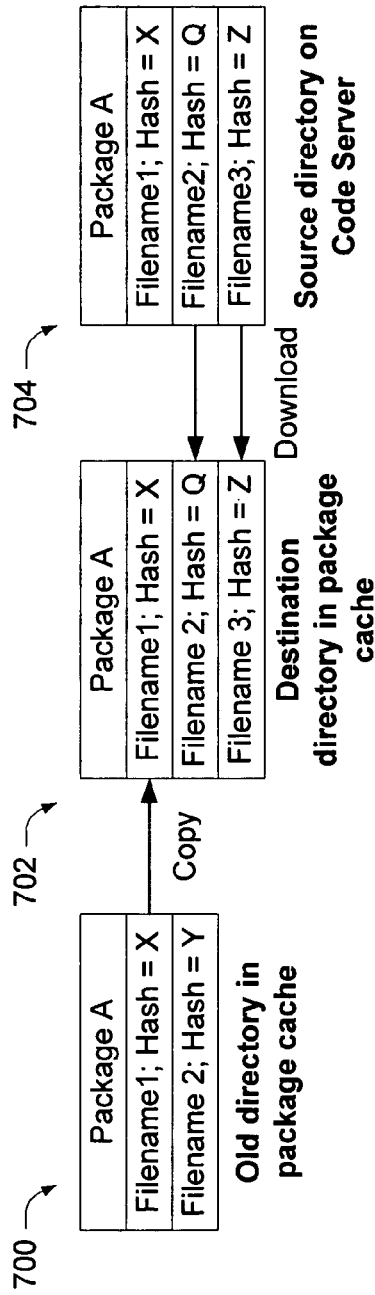
FIG. 7 is a block diagram illustrating how file hashes can be used for versioning in accordance with one embodiment.

When a file is updated, hash values can serve a useful purpose in identifying files that have not been changed between different versions of an extension. Consider FIG. 7, for example. There, an old directory 700 in a client package cache contains package A which include two files—file 1 with hash=x, and file 2 with hash=y. Assume that this package is associated with an older version of an extension. When an updated version is produced, its package manifest is delivered to the client. The updated extension version is represented on a source directory of a code or web server 704. The package manifest includes the hash values for all of the files in the new extension version. A new client destination directory 702 is defined for all of the files of the new extension. If any of the hash values for files in the new extension are the same as the hash values of the files in the old directory 700, then those files can be copied directly from the old directory 700 to the new destination directory 702. In this example, file 1's hash value is the same as the hash value for file 1 on the source directory 704, so it can be copied into the new destination directory 702. File 2's hash value, however is different from the hash value for file 2 on the source directory, so it is not copied from the old directory 700. Rather, file 2 is downloaded from the code server. A new file 3 has been added and is also downloaded from the code server. Hence, in this example, a new version of an extension resulted in a download of less than all of the files in the extension version. This is because hash values for each of the files in the old extension version were able to be compared with hash values of the files in the new extension version. Those hash values that are the same indicate files that have not changed as between versions.

Using hash values for versioning has two important advantages over traditional versioning schemes. First, the update process is automatic. That is, with an explicit version number, it is possible to forget to update the version number when shipping a new release of a file. Using hash values avoids this problem. Second, versioning does not rely on file types. Specifically, traditional versioning schemes commonly embed version information within files; however, not all files (e.g. GIF files) support embedded version information. In the present example, using hash values for versioning does not depend on whether a particular file type supports or does not support embedded version information. In addition, the version information can be stored separately from the file itself. Thus, access to actual file to determine whether it is current is not needed.

Total Storage Size of Package

The total storage size of a package is useful at download time to verify that the user has sufficient disk space.

ClassID's For the DLLs

Listing ClassIDs for each DLL is necessary to enable script writers to create classes by scripting against the OM. Additionally, this enables a determination of which package contains the code for a particular class.

DLL Load Dependencies

The reason for the dependencies section is to allow for legacy code that relies on being loaded by virtue of being in the search path of some other dll. In this case we have to make sure that the dependency dll is in the package cache directory before the dependant dll is loaded. FIG. 6 shows an exemplary package manifest 600 that is defined in a hierarchical tag-based language. Advantageously, the tag-based language comprises XML which is desirably extensible and flexible. In this example, a number of tags are provided in a hierarchical arrangement. The "package" tag contains information about the size of the package. The "files" tag is a child of the "package" tag and contains information about the file groups that are contained in that particular package. The "file" tag is a child of the "group" tag and contains information about specific files that comprise the extension, i.e. file name and hash value. A "dependency" tag is provided as a child of the "file" tag and lists any dependencies as discussed above. A "COMClass" tag is also provided as a child of the "file" tag and contains IDs as mentioned above. The ordering of the file groups in this schema implicitly defines the download order of the files.

Package Delivery

To optimize package delivery, two different delivery schemes are utilized. First, a throttled download approach is utilized using known throttling download techniques. Here, considerations such as available bandwidth and media over which the extensions are being provided are considered.

Second, a background download approach is utilized. Background downloads enable a user to continue to work within an application program while content is downloaded. Foreground downloads are used when the user has explicitly requested a file/extension by clicking, for example, on an extension link, or requested an action, for example, by clicking on the "Compose" mail button, that requires download of files which are not available locally.

Along with background downloads, a queue management feature is provided. Specifically, when an extension must be installed or updated, a package manager, which is essentially a software component that manages packages, is provided with the following information:

URL for the package manifest information on a code server

Figure 8:
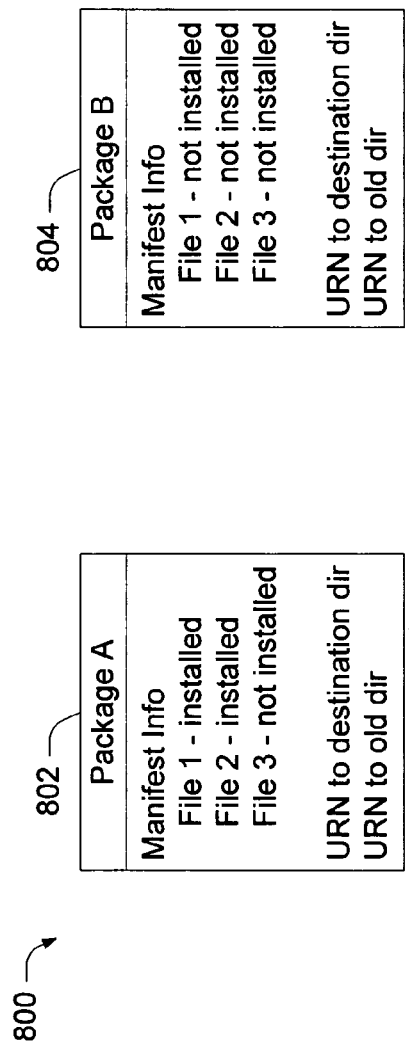
FIG. 8 is a block diagram that illustrates two exemplary package objects in accordance with one embodiment.

URN for package destination directory in the package cache at the client (Optional) URN for the old package directory (if one exists) in the package cache From this information, the package manager creates a package object and adds the package object to a download queue. The download queue is designed for easy rearrangement of a package download order. Consider, for example, FIG. 8 which shows a portion of a download queue 800 that contains two package objects-package object 802 (corresponding to package A) and package object 804 (corresponding to package B). The package objects maintain a list of which files of a corresponding package have been downloaded or installed. In the present example, files 1 and 2 from package A have been installed while file 3 has not been installed; and files 1, 2, and 3 have not been installed from package B. The download queue can be rearranged based on what the user is doing. That is, based on the actions that a user takes, the priority of files that are to be downloaded can be changed. In this example, the package manager is designed to process the first uninstalled file in the package at the head of the download queue. If, however, the user starts to use a file in an extension that is different from the extension whose files are at the head of the download queue, the corresponding package for the file that the user has started to use can be moved to the head of the download queue. Because a file's package is specified by its URN, the file's package can be quickly identified and located in the download queue. For example, and considering FIG. 8, if one of the files in package B is requested before the package manager has started to install package A's third file, then package B will be moved to the head of the download queue.

Figure 9:
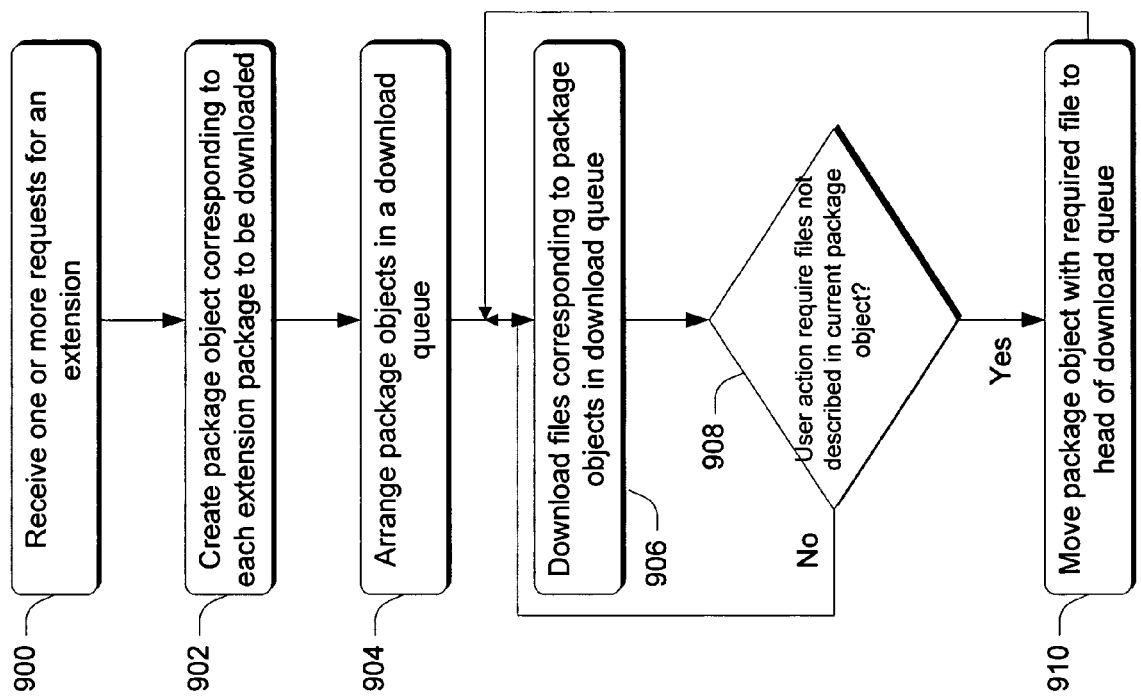
FIG. 9 is a flow diagram that describes steps in a method in accordance with one described embodiment.

FIG. 9 is a flow diagram that describes steps in a download queue management method in accordance with the described example. The method can be implemented in any suitable hardware, software, firmware or combination thereof. In the present example, the method is implemented in software.

Step 900 receives one or more requests for an extension. The requests can be generated in any suitable way. Step 902 creates a package object that corresponds to each extension package that is to be downloaded. Step 904 arranges the package objects in a download queue. Step 906 then downloads files corresponding to the package objects in the download queue. This step can be implemented by, for example, starting at the head of the download queue and downloading files until all of the files for a package object have been downloaded, and then moving to the next package object. Step 908 ascertains whether a user action requires a file that is not described in the current package object. If the user's action does not require a file not described by the current package object, then the method branches back to step 906 and continues to download files associated with the current package object. If, on the other hand, the user's action requires a files that is not described in the current package object, then step 910 moves the package object associated with the required file to the head of the download queue and begins to download files associated with this newly-repositioned package object. This step can be implemented by ascertaining which package object is associated with the required file by ascertaining the URN associated with the file. This URN specifies the file's package so that its package object can be quickly located and moved to the front of the download queue.

Package Creation

One of the innovative features of the described embodiment is its extensibility. That is, a software platform is provided in the form of an application program that can be extended by various third-party user-defined extensions. These extensions are delivered via the Web and are integrated directly into the software platform. In order to provide an organized delivery process, packages should be created in a uniform manner so that they can be predictably handled and integrated into the software platform.

In accordance with the described embodiment, each package should correspond to an end-user feature. For example, in the patent application incorporated by reference above, separate packages are provided for each of the email, contacts, document authoring, and planner functionalities. If packages that do not depend on one another share a dependency, then this shared dependency should become its own package. For example, there is no reason why the email and document authoring functionalities should depend on one another, yet both of them require the ability to publish content. By separating the publishing functionality into its own package, a certain amount of download order flexibility is preserved. Depending on what the user starts to work on, the files corresponding to the email functionality or the document authoring can be downloaded first.

Figure 10:
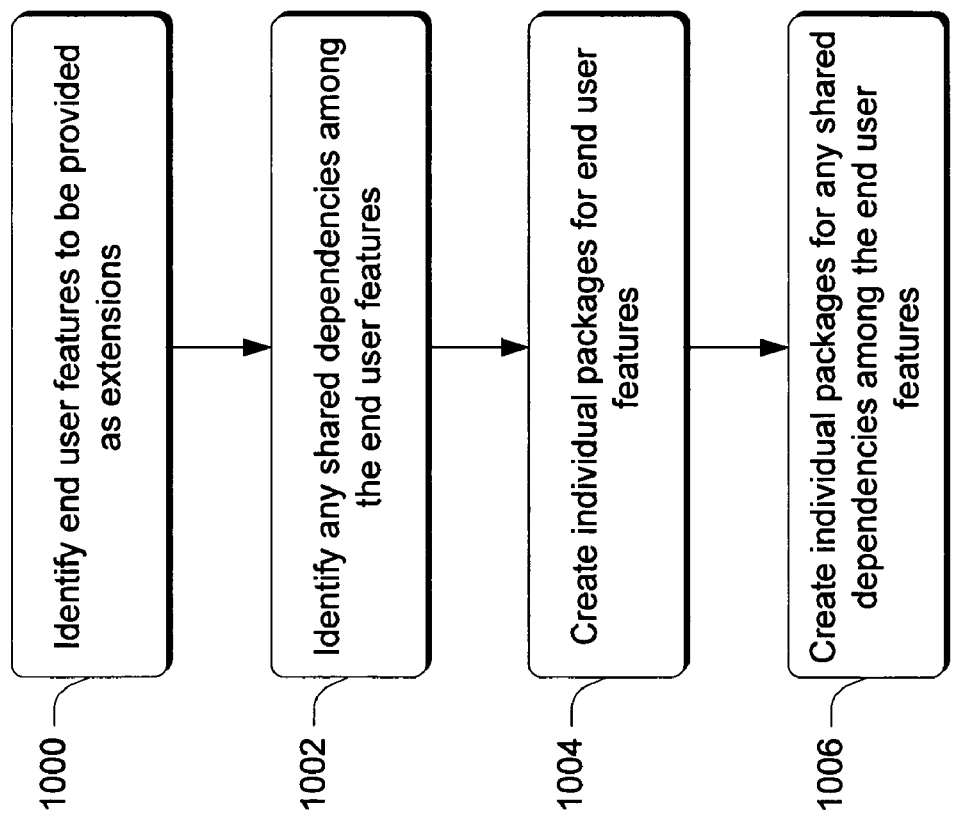
FIG. 10 is a flow diagram that describes steps in a method in accordance with one described embodiment.

FIG. 10 is a flow diagram that describes steps in a package creation method in accordance with the described example. The method can be implemented in any suitable hardware, software, firmware or combination thereof. Portions of the method might, however, be implemented manually.

Step 1000 identifies end user features that are to be provided as extensions. Step 1002 identifies any shared dependencies among the end user features. Step 1004 creates individual packages for the end user features. Step 1006 creates individual packages for any shared dependencies among the end user features.

Automated Package Manifest Creation Tool

Advantageously, and in accordance with one implementation, an automated package manifest tool is provided and takes various input parameters and automatically creates a package manifest. The tool can be available to third parties to assist them in creating a package manifest.

Figure 11:
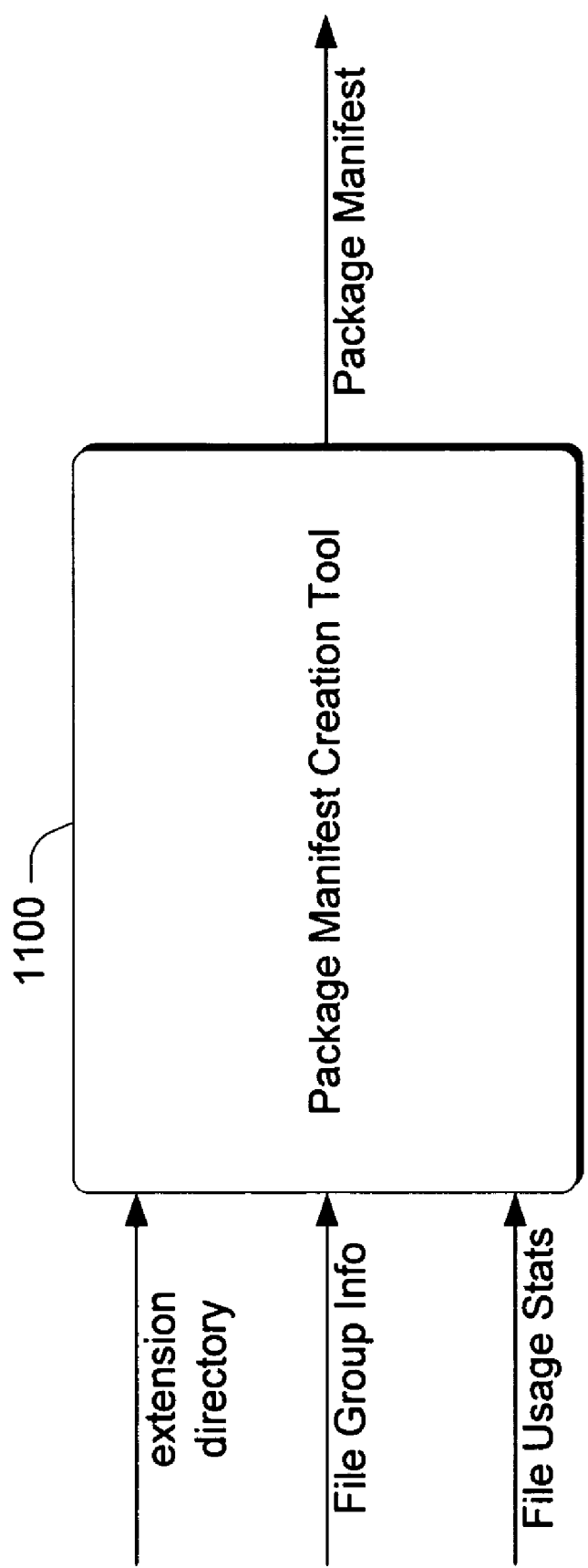
FIG. 11 is a block diagram that illustrates an exemplary package manifest creation tool in accordance with one described embodiment.

FIG. 11 shows an exemplary package manifest creation tool 1100 that is desirably implemented in software. In this specific example, the tool can take the following input parameters (some of which are optional):

Extension directory
File group information and DLL load dependencies (Optional)
File usage statistics from scenario runs (Optional)

The extension directory input parameter specifies the directory containing all of the files that will be described by the package manifest. If this is the only parameter, then tool 1100 will generate a manifest in which the EDF and DLLs in the directory are listed in the "Required" set, and all other content is "Offline".

The file group information and load dependencies parameter is optional. If an extension author has an idea of the categories in which his or her files should be placed, the categories should be specified here. For example, the author of the template manifest shown below knows that he wants his error handling GIF to be included in the package's required set. His choices here will always be respected in the final manifest. Additionally, if the extension author knows of any DLL load dependencies, these should be specified here as well.

```
<?xml version="1.0"?>
<Package>
    <Files>
        <Group Name= "required">
            <File Name = "bar.dll"/>
            <File Name = "foo.dll"/>
                <Dependencies>
                    <File Name= "bar.dll"/>
                </Dependencies>
            </File>
            <File Name= "myextension.edf"/>
            <File Name= "errorhandling.gif">
        </Group> ...
    </Files>
</Package>
```

The file usage statistics from scenario runs parameter is an optional parameter. This parameter enables the file download priority to be determined based on scenario runs. A scenario is a script of tasks that the average user typically follows when using a product during a particular portion of product use. For example, one scenario might pertain to the tasks involved in sending an email message (i.e. click "new mail" button, type in "TO" well, type is "Subject" well, etc.). In the described embodiment, file usage statistics from scenario runs are collected from running IIS logs on various scenarios. The different scenarios are directed to ensuring, with some degree of probabilistic support, that the file download order reflects, in some way, the files that will likely be used by the user first.

It will be appreciated that the file usage statistics can be provided dynamically by building a knowledge base that describes the actual tasks that people typically accomplish. The information that is maintained in the knowledge base can then be used to generate and adapt download scenarios that actually conform to patterns that are established across a user base.

If extension writers want to pass the package manifest creation tool 1100 this information, they need to specify the log directory, as well as the start and end dates of the section of the log that the tool should analyze. For third parties, the download priority order within a group will be the order in which the group's files were requested in the logs across all scenarios.

In one implementation, the approach is somewhat more sophisticated. Additional information (in addition to the scripted steps) is stored in the IIS logs and includes scenario priority and checkpoints. The scenario priority is a priority that is assigned for each scenario. So, for example, if one scenario is ten times more important than another scenario, this information can be maintained. The priority (e.g. a rating from between 1 to 100, with 100 being the highest priority), should be equal to a best guess as to the percentage of the time that users will step through the scenario, assuming they use the extension at all. Checkpoints provide a way to separate one scenario from another. For example, checkpoints designated as "Offline" and "Shutdown" can be automatically added at the beginning and end of the scenarios, respectively, so there can be a differentiation between scenario runs in the log. Additionally, script authors can optionally use checkpoints mid-scenario to indicate a change in group priority, e.g. part of a scenario script could be labeled as an "On demand" feature and another part could be labeled as "Offline".

Figure 12:
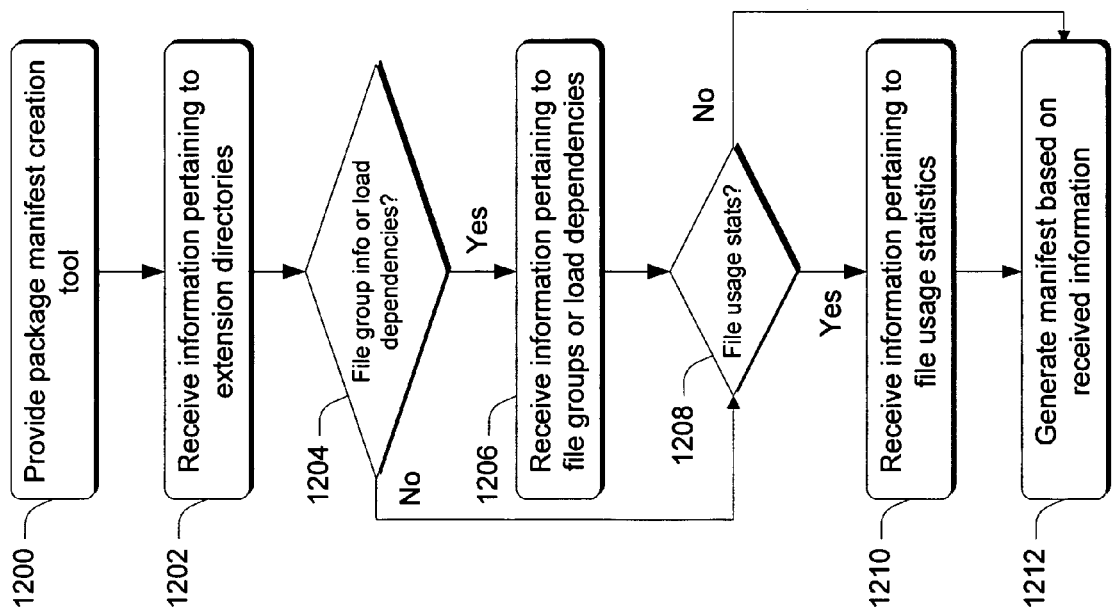
FIG. 12 is a flow diagram that describes steps in a method in accordance with one described embodiment.

FIG. 12 is a flow diagram that describes steps in a package manifest creation method in accordance with the described example. The method can be implemented in any suitable hardware, software, firmware or combination thereof. In the described example, various steps of the method are implemented by a manifest creation tool that is implemented in software.

Step 1200 provides a package manifest creation tool. This tool can be a software tool that resides on an extension author's machine. Step 1202 receives information pertaining to an extension directory as a first input parameter. Step determines whether there is any file group information or load dependency information provided by the extension author. If there is, step 1206 receives the information as an input parameter. Step 1208 determines whether there is any file usage statistic information. Such information can be provided, in one embodiment, through the use of scenario runs as described above. If such information is provided, then step 1210 receives the information as an input parameter. Step 1212 then uses all of the information provided as input parameters to generate a manifest automatically.

Exemplary File Ordering Heuristics Based on File Usage Statistics

Figure 13:
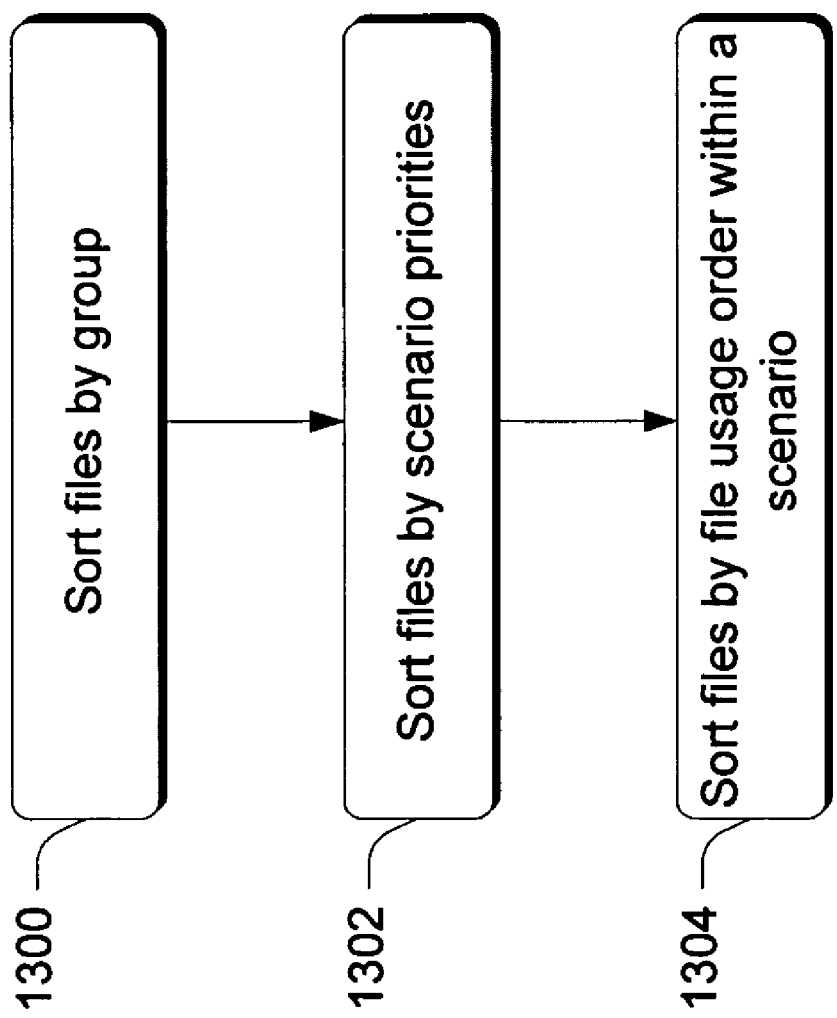
FIG. 13 is a flow diagram that describes steps in a method in accordance with one described embodiment.

FIG. 13 is a flow diagram that describes but one exemplary file ordering or sorting heuristic in accordance with the described embodiment. It is to be understood that this specific example constitutes but one way of ordering files for download. Accordingly, other heuristics can be used without departing from the spirit and scope of the claimed subject matter.

Step 1300 sorts files by file group. Recall that in the illustrated example above, files can be grouped in one of four possible groups: Required, Offline, On Demand and Online Only. A file's group is determined first by the manifest, and, if it does not provide any group information, then by the highest priority group that it uses, according to checkpoint information in the log. Files in the "Required" set should not be considered because their order is already known. If no group information is included about a file, then an assumption is made that the EDF and all DLLs are "Required" files and all other files in the directory are "Offline".

Consider, for example, the following initial file usage information for three different scenarios:

Scenario 1 file usage: 1) FileA.gif, 2)FileB.xml, 3)FileE.dll
Scenario 2 file usage: 1) FileC.xml, 2) FileA.gif
Scenario 3 file usage: 1)File D.js, 2)FileA.gif
Scenario 1=priority 80
Scenario 2=priority 80
Scenario 3=priority 40

In this example, there are three scenarios that have files associated with them. Each of the scenarios has a priority with which it is associated. The files are first sorted by group (step 1300). Recall that in this ordering heuristic, DLLs are "Required" and all other files are considered "Offline". This provides the following sorted files:

Required files
FileE
Offline files
FileA, FileB, FileC, File D

Step 1302 sorts files based on scenario priorities (from highest to lowest). Higher priority files are ordered so that they are downloaded first. This step provides the following sorted files:

Required files
FileE
Offline files
Priority 80 group: files used by Scenarios 1 & 2=File A, File B, and File C
Priority 40 group: files used by Scenario 3 (that are not already listed)=File D.

Step 1304 then sorts the files by file usage order within a scenario run. For each priority grouping with more than one file, the files are sorted according to the average order in which they were downloaded within scenarios of their labeled priority. Scenarios with a smaller average usage order will be downloaded earlier. Ties are broken based on the order in which the scenarios appear in the input file. As an example, consider the following:

File A: average order=(Scenario 1 order+Scenario 2 order)/2=(1+2)/2=1.5.
File B: average order=(Scenario 1 order)/1=(2)/1=2.
File C: average order=(Scenario 2 order)/1=(1)/1=1.

Here, file A got used first by scenario 1 and second by scenario 2 for an average of 1.5, and so one. File C has the smallest order number so, of the Offline files, it is sent first. The final file order is shown below:

Required files
FileE
Offline files
FileC, FileA, FileB, File D
Code, Components and "Bits"

The following files and resources can be, but need not be included with an extension. This list is not exclusive, as other resources can certainly be incorporated into an extension.

Customized UI and keyboard shortcuts
Components and Behaviors
XML browsing and editing components (including XSL and business logic objects)
Static pages or other resources
Third-party defined custom content Users install extensions by navigating to a network site for the extension. In an Internet implementation, the user navigates to an appropriate URL for the extension. Hosting administrators can also "push" extensions so that users can automatically receive them by adding an entry into the appropriate users' "Preference" settings.

Platform Set Up and Extension Installation

Figure 14:
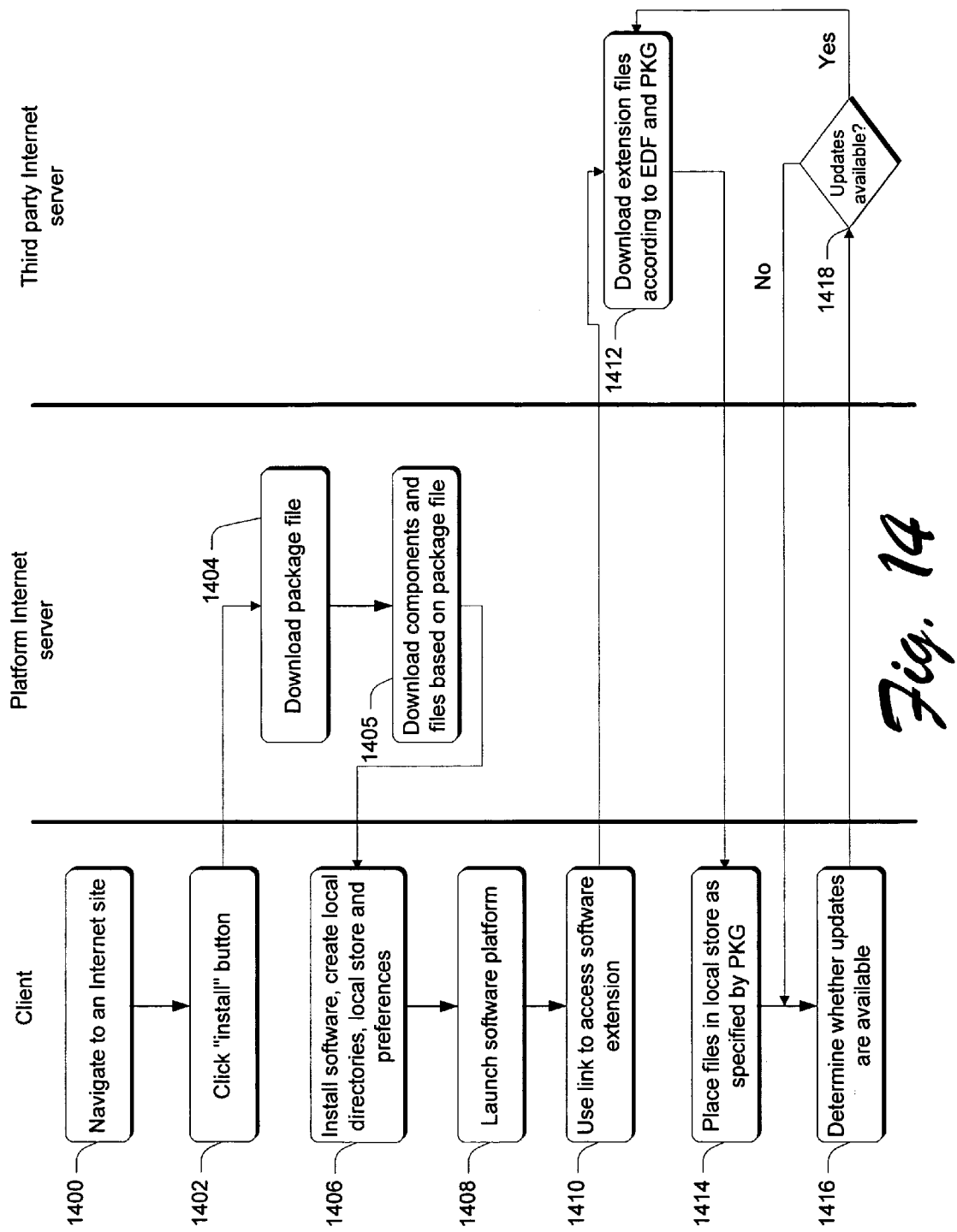
FIG. 14 is a flow diagram of steps in a method in accordance with the described embodiment.

FIG. 14 is a flow diagram that describes exemplary steps in a set up and extension installation process in accordance with the described embodiment. This example describes an Internet-based example. In the illustrated example, various extensions are maintained at or accessible through various Internet sites. The extensions are deliverable via the Internet to a client. It will be appreciated that the illustrated division of computers may not necessarily exist at all. For example, all of the functionality embodied by the computers may reside on one machine, or the extension may be local, or the platform and the extensions may be on the same machine, etc.

The flow diagram, in this example, is illustrated in connection with three separate "zones", one of which represents a client, one of which represents a "platform" Internet server, and one of which represents a third party Internet server. The acts that are described in connection with the different zones are performed, in this example, by the entities assigned to the zone. In some configurations, one or more of these zones may overlap. For instance, the platform server may be the same device as the extension server.

Step 1400 navigates a user to a particular Internet site that is associated with the software platform that is to be utilized as the foundation for extension installation described below. In step 1402, the user clicks an "install" button that sends a message to the software platform server that indicates that a user wishes to install the software platform. This step can be an optional step. Steps 1404 and 1405 then download the software associated with the software platform to the client. In the illustrated example, step 1404 downloads the package file for the single navigable window application and based on that file's contents step 1405 downloads other components and files to the user's computer. Step 1406 installs the software code on the client machine and can create local directories for the application cache, a local store and preferences. It will be appreciated, however, that local directories or preferences are not necessarily needed. Step 1408 launches the software platform.

The steps described immediately above constitute steps associated with an initial set up in which the software code for the single navigable window application is delivered to and installed on a client machine. The steps described immediately below are associated with extension installation.

Step 1410 uses a link that is associated with an extension to access the extension. This step can be implemented by a user navigating their browser to a particular Internet site through which one or more extensions can be accessed. Alternately, a reference to the link can be placed in the user's preferences or the preferences of a computing group with which the user is associated (e.g. the system administrator can place a reference in a group's preferences). The link can advantageously be associated with a third party Internet server or Internet site.

Step 1412 downloads extension files according to the PKG associated with an EDF. The files are delivered to the client and step 1414 places the extension files in a local store as specified by the PKG specification. At this point, an extension is installed and the user can utilize the functionality provided by the extension. Step 1416 determines whether extension updates are available. This can be done by periodically polling an extension catalog (discussed in an "Extension Catalog" section below) to ascertain whether there are any updates to various extensions. Alternately, notifications might be automatically sent to the client so that the client is aware of updates or any other method might be used to determine if updates are available. If there are updates available, step 1418 branches to step 1412 which downloads the extension files associated with the update and installs them on the client.

Developing Extensions

Developing extensions for the software platform is a fairly straight-forward process. A developer develops the extension content using a tool such as Notepad or other tools such as Visual Studio. The extension is then described in an EDF and PKG and the PKG is digitally-signed and then optionally compressed. The extension can then be hosted on a particular network server.

FIG. 15 is a flow diagram that describes steps in an extension development method in accordance with the described embodiment. One or more of these steps can be performed by a software developer or organization that creates a particular extension. Some of the steps are implemented in software. Step 1500 develops an extension. Any suitable tools can be used to develop the extension. Step 1502 then creates an extension definition file (EDF) for the extension. The EDF, in this example, is defined using XML as discussed above. Other formats can, of course, be used to describe the EDF. Step 1504 creates a package manifest (PKG) for the extension. The PKG, in this example, is defined using XML as discussed above. Step 1506 then hosts the EDF and PKG on a network server such as an Internet server. Additionally, the associated extension files that are described in the PKG can also be hosted by the network or Internet server (step 1508). Having accomplished the above, users can now navigate to an EDF directly (using, for example, the associated URL or some other network address), which then installs the extension by caching any required files locally and placing a reference to the extension in the user's preferences.

Specifically, step 1510 delivers the EDF and PKG files to a client. This step can be implemented by a user navigating to a particular Internet site where the appropriate files are hosted and then downloading the files. Step 1512 delivers the extension files that are associated with the EDF and PKG files to the client, whereupon they can be installed and used.

Extension Catalog

One optimization, discussed briefly in connection with FIG. 14, is an extension or EDF catalog which provides an additional level of indirection to the EDF. An EDF catalog allows organizations to group extensions and provides a single place to determine when an extension changes. The desired extension can be automatically selected from the catalog by the software platform based upon the user's settings. The catalog can be queried to determine which extension is most appropriate for the user.

In the described embodiment, a catalog is an XML file that contains mappings from extension URNs to one or more package URNs based upon language, version or other attributes. Catalogs can, however, be defined using any suitable format. Catalogs can provide:

The ability for a hosting organization to update version information for one or more hosted extensions in a single place Optional automatic indirection to correct version based upon user's settings. For instance, a catalog may list several versions of an extension for different languages. The catalog file can be processed to find the version of the extension that matches the user's language settings.

Optional automatic upgrade to new versions of extensions as they become available Like EDFs, catalogs can be compressed and digitally signed to prevent tampering. By subscribing to a catalog in order to detect changes for one or more hosted extensions, the number of server pings required from the client (or notifications to the client) in order to discover extension updates can be reduced.

FIG. 16 shows an exemplary XML catalog structure. Entries in the catalog can be structured as follows:

| Attribute | Type | Required | Description |
| --- | --- | --- | --- |
| extensionURN | uri | Y | Identifier for an extension. There may be more than one entry for a given extension urn in a single catalog representing different versions, languages, etc. |
| name | String | N | Friendly name for an extension. |
| packageURN | uri | Y | Required urn for the package. Package urn corresponds to a discrete set of bits. It is different from the extension urn: For each user, the extension urn (name) corresponds to a specific set of files based upon language preferences and version. This means that, for shared machines, different users may have different extensionURN to packageURN maps based upon their preferences. |
| packageURL | uri | Y | url of the digitally signed compressed file containing the PKG file is required. |
| language | String | N | Language is an optional language specifier. |
| version | String | N | Version is an optional version specifier |
| defaultLanguage | String | N | DefaultLanguage is an optional attribute specifying the default language package. For a given version of an extension, there should be only one entry with DefaultLanguage attribute. |
| defaultVersion | String | N | DefaultVersion is an optional attribute specifying default version for an extension. For a given extension urn and language attribute there should be only one entry with DefaultVersion attribute. |

In this particular example:

The default language of the netdocs-planner is the English version.

The default English version is 1.1. The default French version is 1.0. If there is no version available in the user's specified language on the platform, they will get the English version 1.1 by default.

The English version of netdocs-planner has been upgraded from V1 to V1.1.

There is also a French version. The extension URN is the same as the English version. There is no 1.1 release for French yet, so 1.0 is the current version for French speaking users.

A query against the catalog returns only the rows where language matches the user's language preferences. The query would also return all rows where language is the user's language or default='yes' and throw out duplicates for the same name.

Architecture

In the described embodiment, one of the aspects that provide desirable utility is the extensibility of the software platform. That is, third and fourth party developers are free to develop their own extensions which can then be used within the framework of the software platform. The extensions are integrated directly into the software so that the platform's functionality is modified by the extensions. Recall that in order to provide an extension, the developer simply authors the extension, describes their extension in an EDF and PKG, and then hosts the EDF, PKG, and associated files on a network server.

The EDF, as pointed out above, can be defined in an XML schema that includes a root node (i.e. the "extension" tag) and one or more child nodes. In this particular example, the child nodes generally correspond to the individual extension feature types that are desired for incorporation into the software platform. For example, recall that Tables 1-3 above describe various exemplary predefined feature types that can be added through an extension using the predefined XML schema.

Consider now a developer who wants to add two menus and a toolbar to the software platform. The menus and toolbar might be associated with a retail store that maintains a Web site for its customers. The retail store might want a customer who visits its Web site to be presented with a UI that is unique to the retail store and provides services that are specifically tailored to the store. To do this, the developer develops two different menus, one of which might be associated with displaying the most recent specials, and other of which might be associated with providing a search mechanism through which the user can search for specific products. The toolbar might contain specific buttons that are unique to the retail store. A simplified EDF called "retail.edf" for the retail store's extension is shown directly below:

```
<edf:extension name= "retail extension" urn= "extension.retail.com">
    <edf:menus>
        <edf:menu url= "url1.htm"/>
        <edf:menu url= "url2.htm"/>
    </edf:menus>
    <edf:toolbars>
        <edf:toolbar url= "url3.htm"/>
    </edf:toolbars>
</edf:/extension>
```

Here, the outer "extension" tag designates this XML file as an extension. The inner "menus" and "toolbars" tags are top level tags that designate that the information between these tags pertains respectively to menus and toolbars that correspond to the extensions that the developer has added. The boldface "menu" and "toolbar" tags describe data pertaining to the actual extension and contain a URL that is associated with each extension as described above. The EDF above logically describes the extensions that are being provided as including two menus and one tool bar.

Consider also that the above EDF can constitute but one of many EDFs that are loaded into the system. Each EDF can contain one or more top level tags, each of which is associated with one or more specific extensions that are to be added to the software platform.

Figure 17:
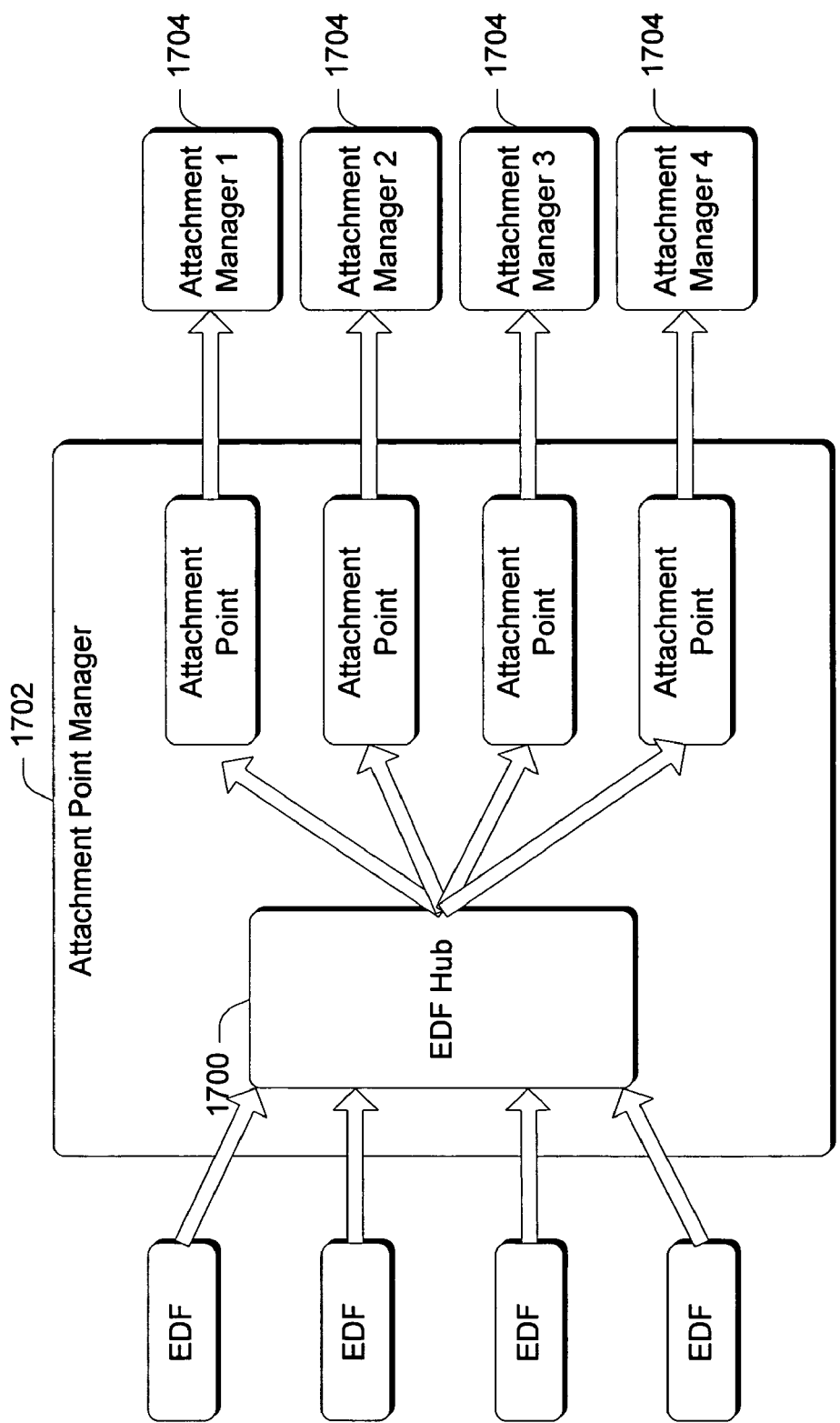
FIG. 17 is a block diagram of a software architecture in accordance with the described embodiment.

FIG. 17 is a block diagram of an exemplary software architecture that is configured to process multiple different EDFs so that the software components that are responsible for incorporating each particular extension into the software platform receive the appropriate information that is specific to their extension. This example is specific to the XML implementation that is discussed throughout this document. It is to be understood that other architectures, similar in functionality to the one discussed below, can be used in other implementations without departing from the spirit and scope of the claimed subject matter.

Utility objects, herein referred to as attachment points, are used to process the information from the multiple EDFs. An attachment point is simply a collection of objects that fire events to registered listeners as objects are added to or removed from the collection. Many types of attachment points can be created, but all take data from a source (often another attachment point), process it (either dynamically or statically), and expose the results of their processing. Some of the simplest attachment points include:

An XML attachment point, which loads an XML file and exposes the top-level nodes of the XML as objects in its collection.

A filter attachment point, that connects to another attachment point and exposes only those objects from it that meet some criteria.

A merge attachment point, that connects to one or more other attachment points and exposes all of their objects as one, merged collection of objects.

In the illustrated example, the architecture includes a collection of one or more attachment points, including a funnel structure known as an EDFHub 1700, an attachment point manager 1702, and multiple attachment managers 1704. The EDFHub 1700 receives all of the EDFs and merges them together and exposes them as a single list. Other individual attachment points provide mechanisms that manipulate (including filter, merge and expand) the single list that is exposed by the EDFHub 1700. Whenever a new extension or EDF is added to or removed from the EDFHub, the various attachment points will see to it that the appropriate attachment manager(s) is notified. This is done by firing events to the appropriate attachment managers. The attachment point manager 1702 creates, destroys and manages the various attachment points in the system and allows easy reuse of identical attachment points.

For each top level tag (i.e. "menus" and "toolbars" tags), there is a corresponding attachment manager 1704 that uses data provided by the attachment points to incorporate a particular type of feature within the software platform. Each attachment manager requests a set of attachment points from the attachment point manager 1702. These manipulate the data exposed by the EDFHub 1700. In the illustrated example, the attachment points can be requested as a predicate chain that the attachment point manager uses to create and build a set of attachment points that operate on the data exposed by the EDFHub 1700.

Figure 18:
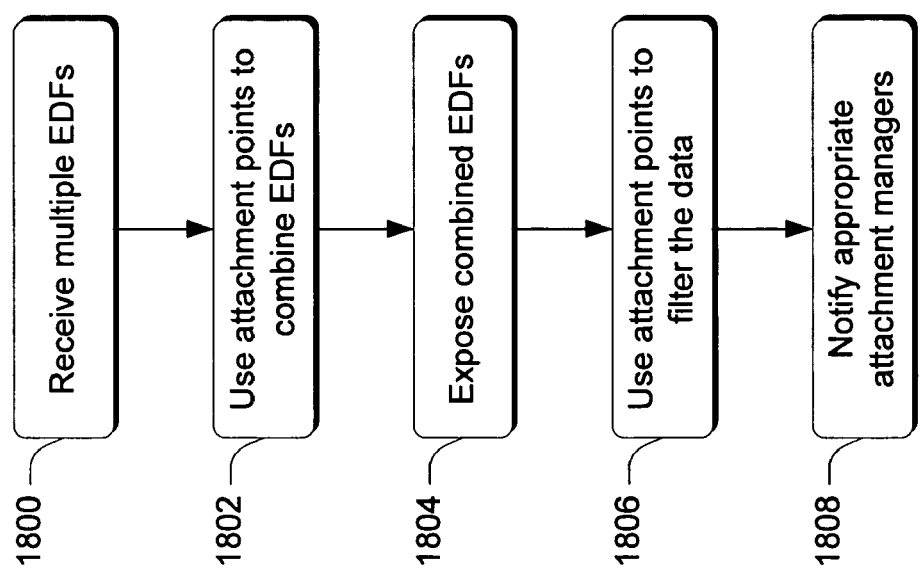
FIG. 18 is a flow diagram of steps in a method in accordance with the described embodiment.

FIG. 18 is a flow diagram that describes steps in a method in accordance with the described embodiment. The method is implemented in software and, in this example, by the software components of FIG. 17.

Step 1800 receives multiple EDFs. These files can be received in any suitable way. For example, a user can specify in their preferences particular extensions that they desire to be loaded when they are online. Alternately, a user might navigate using a link to a particular Internet site that recognizes that the user is executing a software platform that is configured to dynamically add the extensions. The EDFs, in this example, are funneled into the EDFHub 1700 which uses attachment points to combine the EDFs (step 1802). In this example, the EDFs are defined as XML files and the nodes are combined into one single XML list. Step 1804 exposes the combined EDFs. In this particular example, the EDFs are combined into a single XML list that is exposed to other various attachment points which then further manipulate that data (step 1806). One goal of the attachment points is to avoid having the attachment managers 1704 re-query the whole system every time an extension gets added or removed from the system. Thus, if an extension gets added or removed, the attachment points ensure that only the appropriate attachment manager 1704 is notified of the specific additions or deletions of the extension. For example, if an EDF indicates the addition of a menu, then only the attachment manager associated with menus is notified. Accordingly, step 1808 notifies the appropriate attachment manager of any new data that matches the attachment managers requirements.

Attachment Points and the Attachment Point Manager

Attachment points are objects that expose collections of ordered objects and fire notifications when new objects are inserted or deleted. In the exemplary system, the objects are XML nodes, but they could be any type of object. Although there are many types of attachment points, they all follow a similar process:

1) Initially attach to one or more data sources. These could be files or, commonly, other attachment points.
2) Process the data based on some logic. Usually the logic is quite simple and could involve something like filtering the objects based on some criteria.
3) Expose the results of the processing step 2 in a new collection of objects.
4) Fire events to indicate how the exposed collection of objects changed (OnInserted(index, count) or OnRemoved(index, count).
5) Optionally, continue to listen for changes in the data sources and repeat step 2-4 when changes occur.

Alone, each attachment point is quite simple, but when different types of attachment points are combined to form "chains", where one attachment point processes data from a second attachment point, the processing can be quite powerful. This is especially true if the attachment points only process the changed data in step 2, since they only do a small amount of simple work at any one time. In the exemplary system, this incremental processing means that the whole system does not have to be re-queried when a new extension is installed or when an existing extension is removed. Additionally, each attachment manager in the exemplary system uses a specific chain of attachment points and so is only informed of changes that impact its area of extensibility.

The attachment point manager performs two important functions when building chains of attachment points. First, it allows the chains to be described as predicate strings. The attachment point manager interprets these strings and builds the required chain of attachment points. Second, it allows the reuse of identical attachment points, which makes the system more efficient. As the attachment point manager creates each chain of attachment points, it tracks which predicate string corresponds to which attachment point. If that predicate string is later requested again, it simply reuses the existing attachment point without creating a new one.

As an example, consider that the attachment manager associated with menus has requested the following predicate chain of attachment points that utilizes the retail.edf file above: (Note: this example does not assume the presence of an EDFHub attachment point).

Explode(Filter("menus", Explode (URL ("retail.edf"))))

This string represents all of the menus in the retail.edf file. The XML file located at retail.edf is loaded by the URL attachment point which exposes the root node of the XML file as the only object in its collection. The inner Explode attachment point uses the URL attachment point as its data source and exposes all of the children of the objects in that source collection. In this case, the children of the root node are the top level XML tags "menu" and "toolbars". The Filter attachment point uses the Explode attachment point as its data source and filters the exposed objects looking only for the nodes that are "menus". The outer Explode attachment point uses the Filter attachment point as its data source and exposes all of the children of the filtered menu nodes to provide a list containing the two menus that are added by the extension. Since this particular XML file contained menus that were identified by the attachment points associated with menu attachment manager, that attachment manager is then notified that two menus have been added by an extension.

Figure 19:
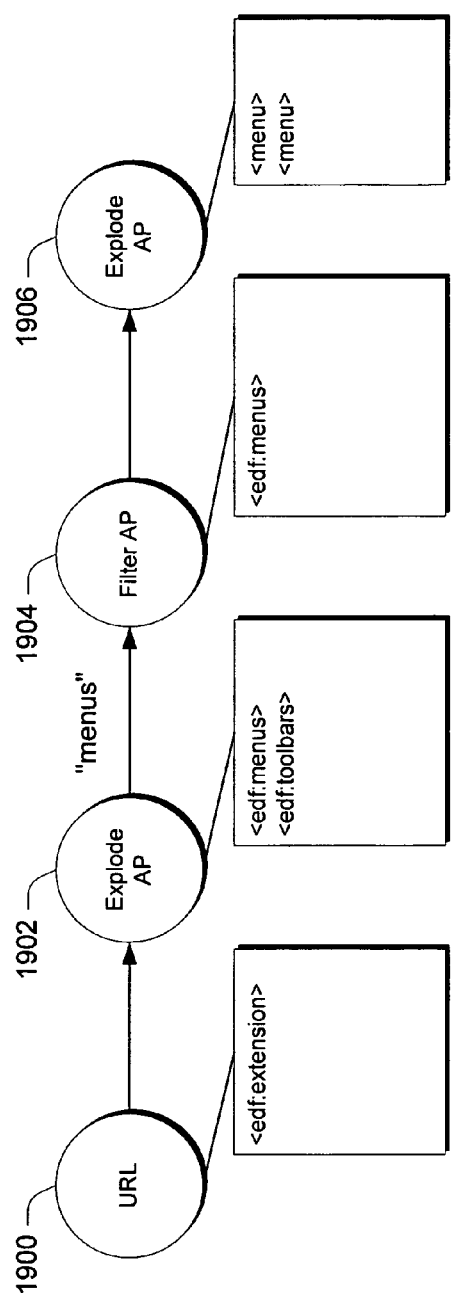
FIG. 19 is a diagram that illustrates one aspect of attachment point architecture in accordance with the described embodiment.

This process is diagrammatically illustrated in FIG. 19 which shows attachment points 1900, 1902, 1904, and 1906. Each attachment point exposes a list of XML nodes. URL attachment point 1900 takes an input (a URL to an XML file—e.g. retail.edj) and exposes a list of XML nodes. This list contains only the root node "<edf:extension>". Explode attachment point 1902 takes as an input attachment point 1900 and exposes a list of XML nodes which are children of source XML nodes. In this example, the list of XML nodes exposed by attachment point 1902 are the "<menus>" nodes and the "<toolbars>" nodes. The filter attachment point 1904 takes attachment point 1902 as an input and filters on "menus." It then exposes an XML list having only "<menus>" nodes in it. The explode attachment point 1906 takes attachment point 1904 as an input and exposes a list with the XML nodes that are contained in the "<menus>" nodes—here both of the "<menu>" nodes.

Consider additionally that the toolbar attachment manager would request a predicate chain of attachment points which would also use URL attachment point, an Explode attachment point and a filter attachment point 1904 that filters on "toolbars". Thus, the corresponding explode attachment point 1906 would expose an XML list containing only the "<toolbar>" node. But, the attachment point manager would detect the commonality of the URL attachment point and the inner Explode attachment point, so it would reuse the same attachment points it created for the menu attachment manager. The Filter attachment points used by the toolbar attachment manager and the menu attachment manager would use the same Explode attachment point as their data sources but would expose different collections of nodes, because they were filtering based on different criteria.

Figure 20:
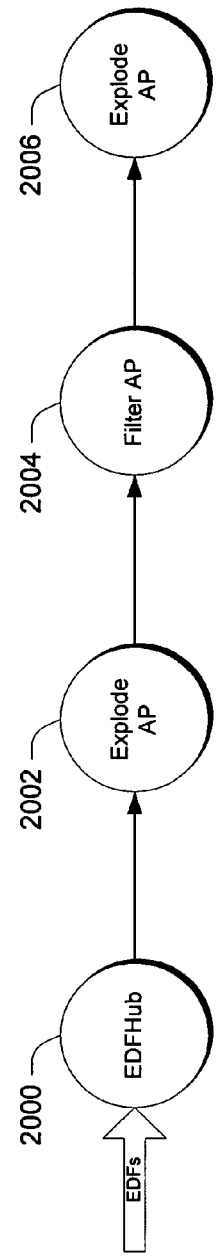
FIG. 20 is a diagram that illustrates one aspect of the FIG. 17 architecture.

Consider FIG. 20 which incorporates an EDFHub attachment point 2000. This attachment point receives all of the EDFs and, as discussed above, combines them into a single XML list. The EDFHub then exposes the root nodes of all of the EDFs. The explode attachment point 2002 then exposes an XML list that contains all of the top level nodes for all of the EDFs. As an example, there may be multiple EDFs that each contain top level menu nodes, toolbar nodes, accelerator nodes and the like. Explode attachment point 2002 exposes an XML list that contains all of these top level nodes for all of the EDFs. Filter attachment point 2004 can then filter the XML list exposed by the explode attachment point 2002 in accordance with any suitable parameters (i.e. filter on menu nodes, tool bar nodes, accelerator nodes and the like). The final explode attachment point 2006 then exposes a list of the individual children nodes of the list exposed by the filter attachment point 2004. This list describes all of the specific features (of the particular type that were filtered) that have been added by all of the EDFs.

The table below lists a number of different attachment points that can be utilized in accordance with this described embodiment but many more can easily be created.

| Attachment Point | Purpose |
|---|---|
| URL | Loads the URL and exposes the top level XML node as a member of the collection |
| Context | For every member, it gets the "expression" attribute and binds to it. If the expression evaluates to true, then the member is exposed. |
| EDF | Same as the URL AP, but also exposes a fabricated member with data to create an APP based on the URL and URN (which exists in the XML DOM). |
| Merge | Takes zero or more Attachment Points (of any type) and merges them together. The order and continuity of the original collections will be maintained. |
| Filter | Monitors a single Attachment Point and only exposes those nodes that match the specified name. The order of the original collection will be maintained. |
| Duplicate | Monitors a single Attachment Point and filters out any duplicates. A duplicate is defined to be having the same URN attribute. If no URN attribute is present then the node is exposed. Order of the original collection will be maintained. |
| Explode | Monitors a single Attachment Point and for every member exposes the children of that member as its members. The order of the original collection will be maintained as well as the order of the children within the nodes. |
| Link | Monitors a single Attachment Point and for every member looks for a URL attribute and creates a URL AP and merges it into itself. If the optional include Content is set to true, it will merge the original collection in as well. |
| Order | Monitors a single Attachment Point. For every member, it gets three attributes: id, before and after. Based on this information, it reorders the members as specified. If no ordering information is supplied, the order of the original collection will be maintained. |
| EDFHub | This Attachment Point is the central merge point that represents all the EDF points. |

CONCLUSION

The embodiments described above provide a platform solution that provides for customization and extensibility through a consistent and logical extensibility mechanism and object model that can be easily understood by third party developers. Internet-based downloads can be accomplished without a great deal of user intervention and without manipulating any user persisted settings. Extensions can be provided to a software platform or application program dynamically based upon the user's computing context.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A computer-readable medium embodying computer-executable code that implements a software architecture, the architecture comprising:
    multiple attachment points collectively arranged to filter data associated with files that describe software extensions, each attachment point including logic for filtering data;
    an extension definition hub to:
        receive the data associated with files that describe software extensions as multiple extension definition files;
        combine the multiple extension definition files into a single list;
        expose the single list for processing by the multiple attachment points; and
    multiple extension managers each associated with one or more of said multiple attachment points and with a respective feature type that can be added to a software platform by software extensions and being configured to receive data from the associated one or more said multiple attachment points that pertains to a software extension having the respective feature type with which the extension manager is associated and to process the received data to add the software extension to the software platform.

2. A method comprising:
    receiving data associated with files that describe software extensions as multiple extension definition files;
    combining the multiple extension definition files into a single list;
    exposing the single list for processing to install the software extensions in a software platform;
    collectively arranging multiple attachment points to filter the exposed single list, wherein each said attachment point includes logic for filtering the exposed single list to obtain data that pertains to software extensions of a feature type with which the attachment point is associated; and
    associating each of multiple extension managers with one of the multiple attachment points;
    associating each of the multiple extension managers with a respective feature type that can be added to the software platform by the software extensions, wherein the extension managers are configured to receive data from the multiple attachment points that pertains to the feature type with which the extension manager is associated.

3. The method of claim 2, further comprising defining the attachment points as predicate chains.

4. The method of claim 2, further comprising filtering extensible markup language (XML) data with the attachment points.

5. The method of claim 4, wherein each feature type is associated with an XML tag.

6. The method of claim 4, wherein each feature type is associated with an XML tag, at least one said feature type comprising a user-defined feature type.

7. The method of claim 2, further comprising exposing collections of ordered nodes with each attachment point.

8. The method of claim 2, further comprising exposing collections of ordered XML nodes with each attachment point.

9. A computer-readable medium embodying computer-executable code that implements a software architecture, the architecture comprising:
a data structure configured to:
receive multiple different files that describe software extensions that can be added to a software platform;
expose the multiple different files to a filter structure comprising attachment points collectively arranged to filter data associated with the multiple different files, each attachment point including logic for filtering data; and
associate each of multiple extension managers with at least one of said attachment points, wherein each of the multiple extension managers is:
associated with a respective feature type that can be added to a software platform by software extensions, and
configured to receive data from the at least one associated said attachment point that pertains to the feature type with which the extension manager is associated.

10. A system for adding functionality to a software platform, the system comprising:
a processor;
memory; and
one or more modules stored in the memory and executable on the processor to provide the software platform, the one or more modules to further provide:
an extension definition file (EDF) hub receiving one or more EDFs and combining the one or more EDFs into a single list, each EDF describing a software extension that can be added to the software platform;
multiple extension managers managing addition of an associated extension to the software platform, wherein each extension manager is associated with a particular feature type to manage software extensions having the particular feature type;
one or more attachment points, each attachment point associated with one or more of the EDFs and with one or more of the extension managers, and notifying the associated one or more of the extension managers when an EDF having a particular feature type associated with the one or more of the extension managers is added to or removed from the list,
wherein, when an EDF is added to or removed from the list, said one or more of the extension managers that are notified responsively add to or remove from the software platform a said software extension that is described by the EDF.

11. A system as recited in claim 10 wherein the one or more attachment points comprise an extensible markup language (XML) attachment point that exposes XML nodes.

12. A system as recited in claim 10 wherein the one or more attachment points comprise a filter attachment point filtering objects from another attachment point.

13. A system as recited in claim 10 wherein the one or more attachment points comprise a merge attachment point that exposes objects of one or more attachment points as one collection of objects.

14. A system as recited in claim 10 wherein the one or more attachment points are arranged in a predicate chain.

15. A system as recited in claim 10 wherein one or more of the EDFs contain at least part of the software included in the extension.

16. A system as recited in claim 10 wherein one of the attachment managers reads a portion of the associated extension from the EDF and another portion of the associated extension from a resource identified by a uniform resource locator (URL) address.

17. A system as recited in claim 10 further comprising at least one package manifest associated with each of the EDFs, each package manifest specifying one or more resources included in an extension.

* * * * *